United States Patent [19]
Vock et al.

[11] Patent Number: 5,798,519
[45] Date of Patent: *Aug. 25, 1998

[54] METHOD OF AND APPARATUS FOR GOLF DRIVING RANGE DISTANCING USING FOCAL PLANE ARRAY

[75] Inventors: Curtis A. Vock, Salem; Kevin J. Grealish, Westwood; Robert D. Frey, Bolton; Dennis Darcy, Dracut, all of Mass.; Joseph Bianco, Deep River, Conn.

[73] Assignee: Golf Age Technologies, Inc., Westwood, Mass.

[21] Appl. No.: 800,203

[22] Filed: Feb. 12, 1997

Related U.S. Application Data

[60] Provisional application No. 60/025,939 Sep. 11, 1996 and 60/011,456 Feb. 12, 1996.

[51] Int. Cl.$^6$ .................. G01C 21/02; A63B 69/36
[52] U.S. Cl. .................. 250/206.1; 273/185 R; 244/3.1
[58] Field of Search .................. 250/206.1; 273/184 R, 273/185 R, 358, 32 R, 35 R, 87 R, 87.2; 342/118; 244/3.1

[56] References Cited

U.S. PATENT DOCUMENTS

| | | | |
|---|---|---|---|
| 4,150,825 | 4/1979 | Wilson | 273/185 B |
| 4,437,672 | 3/1984 | Armantrout et al. | 273/185 B |
| 4,713,686 | 12/1987 | Ozaki et al. | 358/107 |
| 4,828,267 | 5/1989 | Goodrich | 273/185 R |
| 4,893,182 | 1/1990 | Gautraud et al. | 358/105 |
| 4,951,137 | 8/1990 | Kisou et al. | 358/125 |
| 5,111,410 | 5/1992 | Nakayama et al. | 273/183 R |
| 5,138,322 | 8/1992 | Nuttall | 342/126 |
| 5,342,051 | 8/1994 | Rankin et al. | 273/185 |
| 5,398,936 | 3/1995 | Kluttz et al. | 273/185 B |
| 5,413,345 | 5/1995 | Nauck | 273/185 |
| 5,471,383 | 11/1995 | Gobush et al. | 364/410 |
| 5,685,504 | 11/1997 | Schneider et al. | 244/3.1 |

FOREIGN PATENT DOCUMENTS

| | | | |
|---|---|---|---|
| 06323852 | 11/1994 | Japan | G01C 11/00 |
| 2 110 545 | 6/1983 | United Kingdom | A63B 69/36 |
| WO 94/19067 | 9/1994 | WIPO | A63B 69/36 |

*Primary Examiner*—Stephone Allen
*Attorney, Agent, or Firm*—Curtis A. Vock

[57] ABSTRACT

The invention monitors the driving range and tracks golf balls from users at the driving range and informs those users of characteristics such as driving distance. A solid state camera images the range, and preferably one or more tee-off positions, and collects frames of image data to track a ball's motion through space. Simulation routines augment that track and assist in isolating the start location as well as where the ball lands, or would have landed had it not been obstructed (e.g., by a net). Preferably, the invention also determines the ball's position in 3-D to increase the accuracy. In one technique, two or more solid state cameras are used, and synchronized, to specify stereoscopic imaging. In another technique, the ball's energy or physical extent is used to determine an absolute distance between the camera and the ball. A computer at the club house monitors the entire system and further manages a network including an array of displays at the several tee off positions. The computer thus sends information such as distance to the several users via the network.

24 Claims, 14 Drawing Sheets

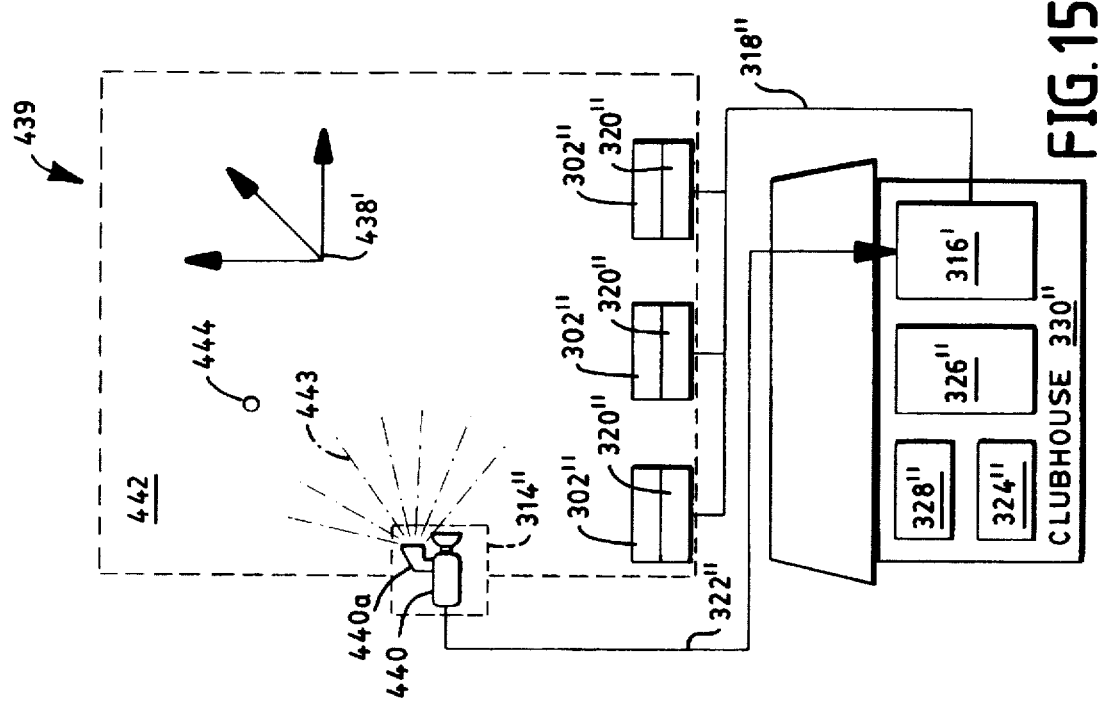
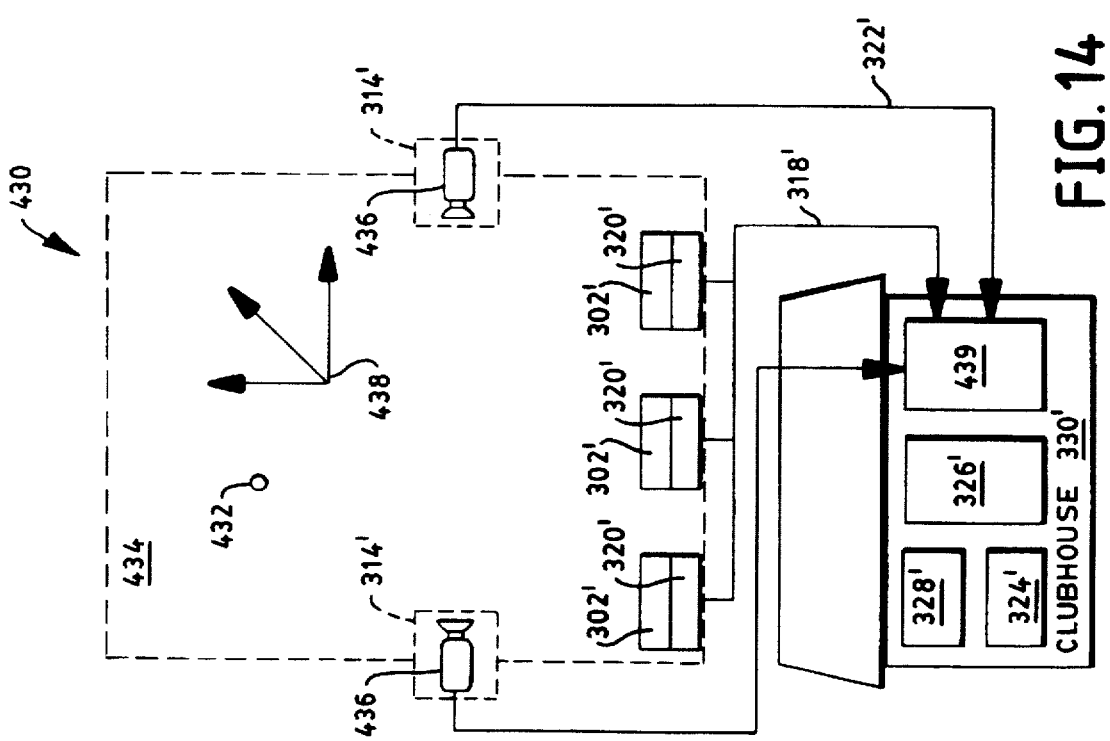

METHOD OF AND APPARATUS FOR GOLF DRIVING RANGE DISTANCING USING FOCAL PLANE ARRAY

RELATED APPLICATIONS

This application is a continuation-in-part of U.S. Provisional Application No. 60/025,939, filed on Sep. 11, 1996, and entitled "Golf Driving Range Distancing Apparatus and Methods," and of U.S. Provisional Application No. 60/011,456, filed on Feb. 12, 1996, entitled "Golf Driving Range Distancing Apparatus and Methods," each of which are expressly incorporated herein by reference.

BACKGROUND

Driving ranges are widely used by golfers to practice their swing for the game of golf. Typically, a user of the driving range rents a bucket of golf balls and positions herself at one of the tee-off positions. These tee-off positions routinely have a mat of artificial grass and a rubber tee mounted through a hole in the grass so that the user can successively mount golf balls and hit them into the driving range with little or no damage to the tee-off position.

One problem with such driving ranges is that it is difficult, at best, to determine the distance of a golf ball hit into the driving range. First, there are typically several or many users simultaneously hitting balls into the range, making the discrimination of your ball difficult. Secondly, the only markers available to a user relating to distance are— typically—a series of signs spaced in set distances (such as fifty yards) from the user. Accordingly, a user can sometimes estimate the distance a ball travels, once hit, to their perceived accuracy in determining where the ball landed relative to one of those signs.

Even this technique is difficult. Driving ranges generally use old and dull-looking balls, reducing their reflective properties and further hindering a user's ability to monitor golf ball movement, especially at dusk or at night, with artificial lighting.

In addition to distance measurements, users of the driving range can only estimate other performance factors, such as slices, draws and the like, by visually monitoring the ball's travel during flight. There is no quantitative analysis of the swing, and there can be no playback of a prior hit unless the user also has a camcorder.

Finally, users at a driving range have no automatic method of statistically measuring their performances, over time, for various factors such as average dub distance, drive improvements, etc., other than keeping a paper record of the data in a log book or portable computer.

OBJECTS OF THE INVENTION

It is, accordingly, an object of the invention to provide systems and methods which solve or improve the above-referenced problems in the prior art.

Another object of the invention provides a system which determines the distance between a user and the location where the ball lands relative to the user.

A further object of the invention is to simultaneously determine and inform a plurality of users of the respective distances to their golf balls, once hit.

Yet another object of the invention is to provide systems which inform one or more users of the angle to which a user hits a golf ball at a driving range.

Still another object of the invention is to provide a system which monitors and determines golf distances on a driving range without regard to the amount solar or artificial light at the driving range.

Yet another object of the invention is to provide methods for accurately assessing and notifying one or more users at a driving range of the distance to their respective golf balls, once the user hits the ball into the range.

Another object of the invention is to provide a 3-D monitoring system for a driving range which permits accurate positioning and determination of the golf ball within the driving range.

Still another object of the invention provides methods and systems for providing statistical factors to users at a driving range.

Another object of the invention provides a visual display, and selective playback, of a ball driven from a particular user's tee-off position.

These and other objects will become apparent in the description which follows.

SUMMARY OF THE INVENTION

In one aspect, the system of the invention includes a CCD camera, e.g., a solid state camera, mounted so as to view at least part of the driving range, including one or more users of the driving range and the ground of the driving range in front of those users. The camera has a plurality of detector elements forming an array which are used to collect successive pictures, or "frames" of image data. Each frame of image data represents a small fraction of time (hereinafter "frame time") such that, in effect, the image is "still" relative to typical human motions. Further, this frame time is fast relative to the motion of a golf ball hit by a user so that the system of the invention can track golf ball movement. The system monitors when a golf ball leaves a tee-off position (in one aspect by assigning one or more pixels to unique locations on the driving range, relative to a specific user, and monitoring when that particular user hits a ball into the range) and tracks that balls movement to the ground. In a preferred aspect, the camera can even view the net, if applicable, and calculates how far the ball would have gone if it was not stopped by a safety net.

Once the system determines the distance for a particular golf ball hit from a particular user, the system notifies the user at the tee-off position by a connected liquid crystal display (LCD) at each tee-off position (note that each tee-off position has a LCD connected, for example, to the wall separating the user from another tee-off position; and those LCD displays are addressed to unique locations by the system).

In another aspect, the camera includes infrared detectors, e.g., HgCdTe-type detector elements with a cooled focal plane dewar, to decrease background noise; or microbolometer detectors, such as the type taught in U.S. Pat. No. 5,286,976 by B. Cole, and which is hereby incorporated by reference. In this manner, the tracking methods of the invention include detection and tracking at night and/or dusk, without regard to visible sunlight or artificial lighting.

In yet another aspect, the system includes a processing subsystem to determine how far a ball travels before the ball completes its journey. Specifically, this aspect includes the steps of monitoring the balls movement during a first period of time, e.g., 1 second, and determining where the ball would land by completing the arc traveled by the ball before the ball actually travels that distance; and relaying this information to the user. This information can be updated, during flight and up until the ball lands, so that the user has a better and better determination of the ball's traveled distance. Once the ball lands, and/or comes to a stop (the system can notify the user of either occurrence, and distance, selectively), that selected distance is displayed to the user with great accuracy.

Preferably, frames of data are taken within a computer processing card adjacent to the camera and mounted on a pole at the far end of the driving range. The camera is adjusted to view one or more users, and the ground in front of the users to the net, so that, in effect, at least about 200 yards is viewed by the camera; and so that a golf ball hit by the viewed user can be tracked to its destination.

The frames of image data taken at the camera are stored and processed by a frame grabber at preferably high rates. On-board processing within the card enables high speed calculations at frame rates suitable to capture golf ball movements around the driving range. By way of example, if a typical user hits a golf ball 200 yards in 5 seconds (i.e., 1440 inches per second), and if each pixel's instantaneous field of view (IFOV) is on the order of a golf ball at 200 yards, then 1440 Hz frame rates will capture a golf ball at each frame and at adjacent pixels, frame to frame. When the composite image is analyzed, such high speed image capture will provide a very smooth motion curve of the golf ball's travel, making distance determination relatively easy.

However, this kind of accuracy is not really needed, in accord with the invention. A golf ball exhibits high luminance when hit with solar or artificial light. Accordingly, its signal as viewed by a visible detector will be relatively high, as compared to the background of the driving range and the users; so that, in effect, the ball is easily viewed and one to one correspondence between the pixels' IFOV and the ball is not necessary. In one aspect, therefore, pixel IFOV's corresponding to two to five golf ball widths is adequate.

For example, if one to one pixel to golf ball IFOV is required (assuming a golf ball is one inch in diameter), then at two hundred yards (a typical driving range distance, user to net), approximately 72 pixels (one dimension) are needed for each tee-off position (72 corresponds to 2 yards wide for each tee off position). This two yard tee-off position corresponds to 10 mrad in optical angle at the camera (2 yards tee off position to a camera placed approximately 200 yards away). For 40 users corresponding to 20 tee-off positions, a field of regard in this dimension should be about 100 mradians, or about 12 degrees. To cover all of this dimension with one camera (and note that multiple cameras can be used to cover the entire field, if desired), 1440 pixels are required to map 1 pixel per golf ball if the IFOV is set to about 0.14 mradians (assuming 1 inch diameter golf balls). However, as discussed above, fewer pixels are adequate, such as 720 pixels mapping one golf ball to about half a pixel at about 200 yards.

Optically, to create such an IFOV depends upon detector dimension and focal length. Many good visible detectors by well-known manufacturers, e.g., Kodak, have dimensions of about 0.001" so that a focal length of 10 inches is plenty to achieve this IFOV resolution (assuming diffraction limited optics with low f#s; so that a 10 inch aperture is plenty, both for photon collection and for reduced diffraction blur).

As the ball gets closer and closer to the camera, which again is placed at the far end of the driving range, facing the users but viewing the users and the ground from the users to the net, about 200 yards away, the camera's IFOV per pixel makes the ball much more discernible (i.e., the ball is closer so, like a human, the camera can "see" better); and, as such, the image of the frames tracking the ball's movement is even smoother.

Thus, in the other dimension, corresponding to the camera's position on a 50 ft pole viewing the user's position and the ground from the user to the net (e.g., 200 yard mark), the camera preferably views about 90 degrees, since a user can hit a ball up into the air at least about 50 feet (approximately the height of the camera). Thus, in one aspect, a wide angle lens is used to provide this imaging. 90 degrees in one axis, and about 25 degrees in another axis corresponds to a total field of view of 2250 degrees^2.

Accordingly, we already discussed that a ball traveling 200 yards requires about 1440 pixels per second to map—pixel by pixel—a ball traveling at 1440 inches per second. Therefore, in five seconds, 7200 pixels at least are needed to map the balls travel with high accuracy. This dimension is compressed into a wide angle format of about 90 degrees, so that each pixel corresponds to about 0.0125 degrees or 0.2 mradians (as compared to 0.14 mradians in the other axis); and thus there is a slight distortion or compression in this axis. However, this distortion will not cause or create any imaging or processing difficulties.

The number of pixels in the camera can depend upon manufacturers. However, we have already stated that it is preferred to have 1440 pixels in one dimension and 7200 in another. Most manufacturers make square arrays; and, hence, a camera with 7200×7200 pixels would be ideal. However, this is over 51 million pixels. While future technologies might easily achieve this, most high quality cameras today have capabilities of about 2048×2048 arrays, or about 4–5 million pixels. This is easily adequate for the first dimension discussed above to cover about 30 users. In the other dimension, this number of arrays is still suitable even though it is a 3-factor off from the desired 7200 pixels. Why? A golf ball is really about 1.75 inches in diameter; so this achieves a two-factor decrease in the needed resolution—bringing the ideal number of pixels to 3600 to see one golf ball per pixel. With 2048 pixels, a mapping of one golf ball to half a pixel is achieved at 200 yards, which is plenty to "see" the ball. If frame rates are made on the order of 500 Hz, then a golf ball moves about one column in the 90 degree dimension (an array of detectors has n rows and m columns, e.g., 2048 rows by 2048 columns).

The data rate for the system of the invention is high At 500 Hz, and with 5 million pixels having 3-bit dynamic range (corresponding to 8 gray levels, which is plenty here), a total of 940 Mbytes/second, which is a very large data rate. However, such data rates are not really needed. The movement of a golf ball is pretty well defined, like the well-known cannon-ball physics of college physics 101. As such, movement of the ball from one pixel to the next, frame to frame, is not needed. Most high quality frame grabbers can operate at 30 frames per second (standard video/TV format viewing), including on-board processing (see, e.g., the frame grabbers by Data Translation of Marlboro, Mass., such as the Fidelity 100 and 200 with 20 Mhz clocks and DT connect capability for 20 Mbytes/second real time processing video rates; see also the electronic cameras by Photometrics, of Tuscon, Ariz., which offers several visible cameras with 2048×2048 pixels, including "uncooled" infrared or I^2 cameras). Even at real-time processing rates of 20 Mbytes/second, then about 4 frames per second can be realized, providing 20 frames of sampling for a typical golf ball going 200 yards. This is plenty to reconstruct an image path to determine distance. Other frame grabbers, such as by Ariel of Highland Park offer frame grabbers reaching upwards of 100 Mbytes per second processing.

The locations of the on-board processing and computer are also important. Some options exist. For example, the camera and computer system, including on-board D/A and real-time graphics processing, can be resident at the same location, on top of the pole with the camera viewing the users. This is advantageous from a data management viewpoint: communicating 20 Mbytes/second (or more) along a data line over two hundred yards is troublesome, and may require special amplification (or fiber optics and TAXI chips) in a serial format that is sent out to the central computer; data communication along a long distance bus is not desirable, in general; and on-board processing enables simple, low-bandwidth transmissions of golf distances to the users. For example, for 20 users, each receiving distance updates at about once per second (which is more than enough), wherein each distance is a 32-bit word, then transmission from the camera/computer system to the users requires only a 80 byte/second line, which is easily achieved with simple wiring.

PCI buses are the latest and most popular data buses, and they preferably only operate at a maximum of 10 inches or so. Accordingly, PCI bus transmission between the camera and processor located some distance away is not reasonable. On-board processing, however, with frame grabbers and adjacent to the camera is a good way to proceed. This data system, in combination with a computer processor, can accurately determine distances for each golf ball hit for a plurality of users.

Alternatively, the camera can be a video camera that views the users and driving range; and transmits a video (analog) signal to the central computer system, located for example at the club house. This is typically done, for example, in security systems for many companies. This analog signal can be fed into a A/D converter so that a digitized image can be used to determine golf ball distances such as described above.

In another aspect, each tee-off position has a laser switch which generates a signal when the user's club breaks the line of sight (for example, the laser views across the tee-off position, from one side to the other, and notes a break in transmission). This signal can then be sent to the data processing system and used as a flag to notify the system that a ball has launched into the air, providing, that is, that the user did not "duff" the ball.

In still another aspect, a system of the invention can include a linear CCD that is scanned across the driving range. Such technology is used, for example, in aircraft reconnaissance. This is convenient because fewer elements are needed; but also it requires moving mirrors.

The resolution required in a system of the invention is dependent upon many factors. Although it simplifies the detect algorithms, it is not necessary to restrict the motion of the ball to one column, per frame, in a detector array in order to detect and process ball location information. One possibility is to allow a ball to pass through 4–6 pixels, per frame, which reduces the accuracy in the initial acquisition; but as the track progresses, and confidence builds, the this metric is greatly improved.

In one aspect, a preferred methodology of the invention is to provide detection hardware at the camera, and to transmit only detection coordinates to a main processor at the club house. This limits the amount of hardware left exposed within the range, to the extremes of the weather, minimizes hardware costs and the risk of theft, and reduces maintenance.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 14 illustrates a 3-D, multi-camera range distance system constructed according to the invention; and FIG. 15 illustrates a 3-D, single camera range system constructed according to the invention.

DETAILED DESCRIPTION OF THE DRAWINGS

Figure 1:
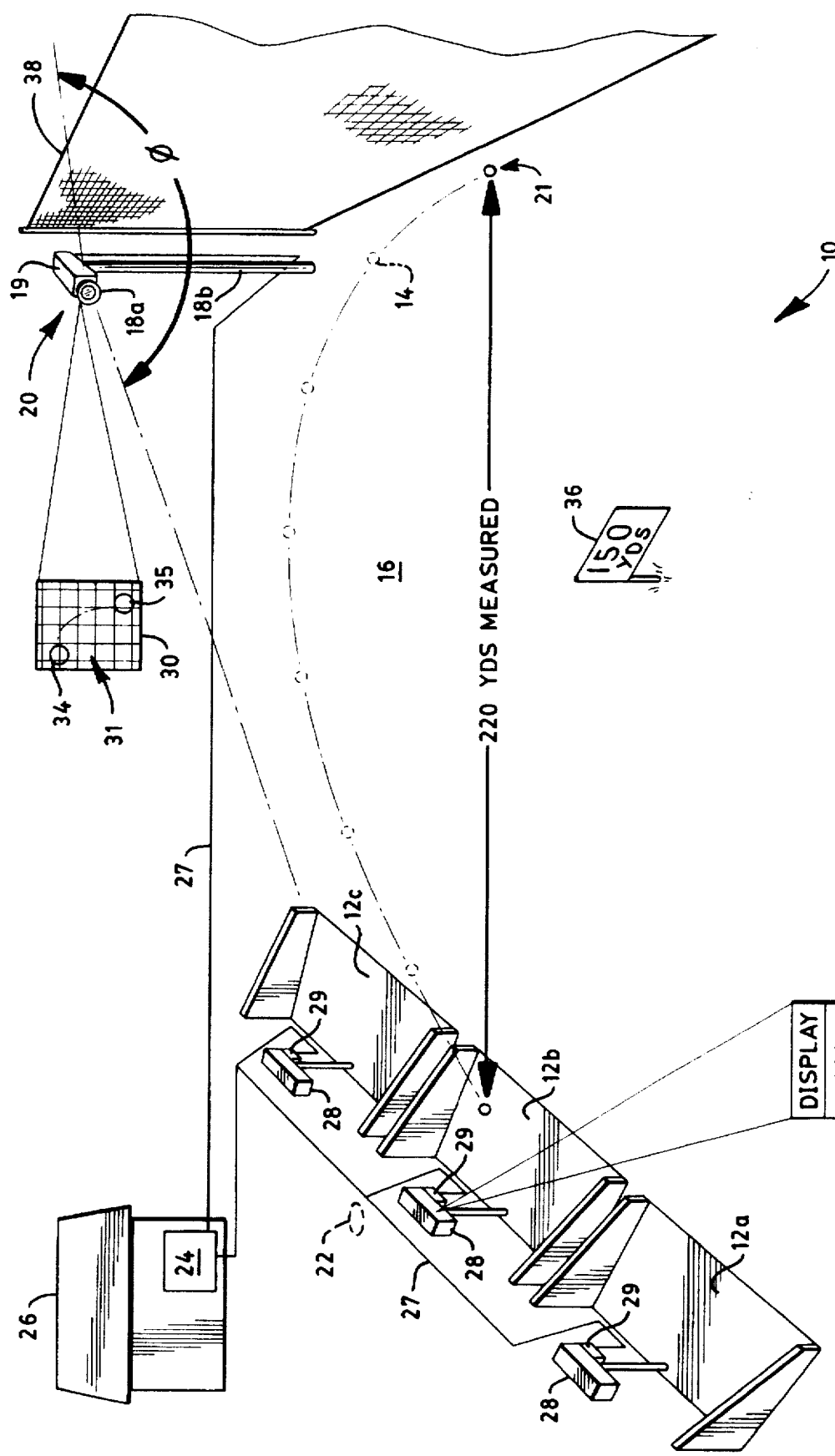
FIG. 1 illustrates one driving range distancing system constructed according to the invention.

FIG. 1 shows a schematic top view of a system 10, constructed according to the invention, for determining, monitoring, quantifying, and imaging selected golfing characteristics such as (a) the distance between a user's position at a tee-off position 12 and a golf ball 14 hit into the driving range 16 from that position (note for clarity of illustration that only three tee-off positions 12a–12c are shown and only one golf ball 14 is shown while in reality there are, typically, ten to eighty tee-off positions 12 at any given driving range and hundreds of balls 14 in the range 16 at any one time); (b) total airborne and/or total distance traveled by a golf ball 14 into the range 16; (c) slice, draw and golf ball height information; (d) user statistics, e.g., the average distance traveled by golf balls hit with a user's driver; and (e) selected playback capability for users at the tee-off positions 12. Other factors can also be determined in accord with the invention and as described below. With further reference to FIG. 1, the system 10 also includes a pole/sensor combination 18 which is constructed and arranged so as to view and monitor some, or preferably all, of the driving range 16 and tee-off positions 12. A solid-state camera 18a mounts on the pole 18b so that its field of view ("FOV") φ conveniently images the range 16 in this capacity. Note that the camera/pole combination 18 can be situated at any appropriate location on or near-to the range 16, such as in the back corner 20, as illustrated, or behind the tee off positions 12, such as at position 22, or within the range 16.

The sensor 18a is described in more detail below. However, it is useful to describe some optional features of such a sensor 18a and the camera's supporting electronics 19. For example, the sensor 18a can be connected to on-board frame grabber and digital signal processing ("DSP") electronics 19 so as to process imagery and distance data at the sensor 18a. However, the sensor 18a can also be made to "detect" golf ball positions in the range 16 with reduced electrical processing and hardware within the electronics 19; and a connected computer—such as the computer 24 at the club house 26—can be used to process the detect signals into relevant characteristics, e.g., golf ball distance. The sensor 18a can also be an analog subsystem, such as a camcorder or security camera, which has very minimal electronics 19 and which generates a video signal that is transmitted to the computer 24 for digitization and processing therein. Preferably, however, the sensor 18a includes a solid state camera and certain digital electronics to interpret, track and/or detect golf ball locations within the range 16. Such a camera thus includes a focal plane assembly ("FPA") with a plurality of detector pixels. These pixels are used to collect "frames" of data which, in combination, are used to track golf ball motion, location and/or other factors, such as golf ball flux intensity to determine distance.

The sensor FOV φ typically extends between the tee-off positions 12 and the range net 38 so that a ball 14 is efficiently tracked from start (i.e., when it is hit with a golf club) to finish (e.g., when the ball lands on the range 16 or when it stops rolling). By way of example, FIG. 1 shows an illustrative FPA reconstruction 30 of data from the sensor 18a which illustratively tracks the ball 14 from the tee-off position 12b to the end-point 21 (note that the image 30a of the ball 14 in reconstruction 30 is illustratively shown as movement across the FPA, corresponding to distance 31, or "220" yards within the range 16 of FIG. 1. Since each detector pixel images a unique ground location within the range 16, a distance 31 is determined by subtracting start and end locations 34, 35 within the pixel array.

Regardless of the type of sensor 18a on the pole 18b, a computer 24 (e.g., a Windows-based Pentium™ or Macintosh™ Power PC™) is used, at least, to manage and control a plurality of displays 28 at each of the tee off positions 12 on a common network 27. The computer 24 also connects to receive selected data from the sensor 18a. These displays 28, e.g., liquid crystal displays ("LCD"), preferably include display drive electronics 29 that receive commands from the computer 24 and that generate alphanumerics and/or graphics on the displays 28 in accord with the commanded signals. In the preferred embodiment of the invention, the display/drivers 28/29 also have a user interface so as to provide an interface at which the user can control or command selected display characteristics, e.g., a numerical display of distance, a graphical display of ball travel, a playback of a previous ball's movement within the range 16, and to insert statistical club information. By way of example, one display 28a is illustratively shown in FIG. 1 as communicating golf ball distance as "220" yards with a "slice."

Those skilled in the art should appreciate that most (if not all) driving ranges have markers 36 thereon to assist golfers in assessing distances. The net 38 is also generally used as a method of stopping balls at a set distance from the tee-off positions 12, e.g., at two hundred yards. FIG. 1 thus illustrates certain advantages of the invention. First, the precision provided by the invention gives quantitative information of ball distances at much greater accuracy than possible by estimating ball distance with a marker 36. In particular, the invention generally provides distance accuracy to less than about one meter for solid state cameras with about one million detector elements. If the sensor 18a has reduced FPA detector density, e.g., a 3H:4V format of 480 pixels by 640 pixels, such as found in typical camcorders, then distances of less than about seven meters are possible. With multi-megapixel cameras, the distance accuracy can be reduced further. The system of FIG. 1 can also estimate the track that a ball would have traveled if not for the net 38. By way of example, the golf ball track across the FPA is typically smooth; and an abrupt stop by the net 38 becomes a discontinuity of that smooth track. In accord with the invention, that track is extended, through simulation, to a location that corresponds to where the ball would have landed, thus giving users additional information that is unavailable in the prior art. This is particularly advantageous in the "dome-type" driving ranges popular in urban communities (e.g., New York City), where the range is effectively within a hemispherical bubble, because such domes typically extend to only about one hundred yards; and the invention can predict, for most, if not all users, how their respective golf balls would have traveled had the dome not stopped the ball.

Figure 2:
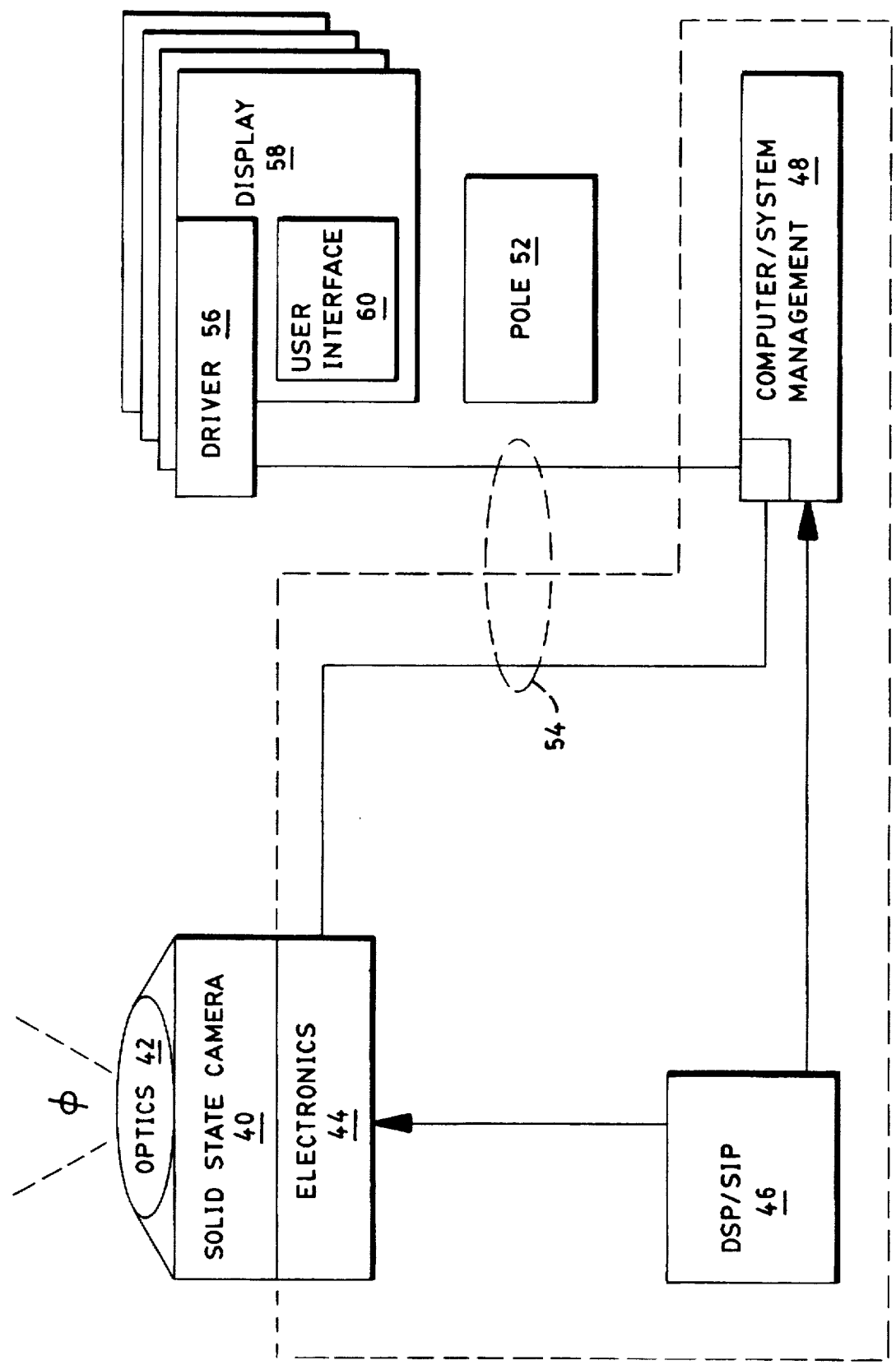
FIG. 2 schematically illustrates functionality between components in a system of the invention.

FIG. 2 illustrates, schematically, key elements in a system of the invention such as described in FIG. 1. A solid-state camera 40 has wide-FOV optics 42 to provide a sufficient FOV φ (e.g., sufficient so as to cover the region of interest through which the golf balls travel). The camera 40 is connected to supporting electronics 44 which provide selective processing of data captured at the camera 40. In one scenario of the invention, the electronics 44 include on-board DSP and signal image processing (SIP) capability 46 which processes successive frames of data from the camera 40 so that, at least, golf balls are detected within the frames. The camera electronics 44 can also include DSP processing capability so as to track each ball during flight to determine, e.g., distance.

Alternatively, the DSP/SIP capability 46 can be external to, or complimentary to, the camera 40. By way of example, the DSP/SIP capability can reside, at least in part, within the computer 48, e.g. the computer 24 of FIG. 1. Accordingly, FIG. 2 shows the DSP/SIP capability 46 as encompassing the electronics 44 and computer 48 via the dotted line 50 so as to indicate that the system has such functionality but that its exact location is a matter of design choice or convenience.

The system of FIG. 2 also includes a pole 52 to mount the camera 40 thereon. The pole 52 is typically about fifty feet high so that the camera and optics 40, 42 generally "look" downwards on balls within the range. This improves image contrast since detecting or tracking a ball with a grass background is easier than detecting and tracking a ball with the sky as the background. The electronics 44 can also be mounted on the pole 52, or somewhere convenient, such as at the base of the pole 52. However, for very high speed digital processing such as on a PCI bus, the electronics are preferably very close or adjacent to the camera 40 so as to reduce data bus transmission lengths.

The computer 48 operates to manage and otherwise control the system of FIG. 2. As mentioned above, the computer 48 can also include selective DSP/SIP capability to assist in the processing of the data collected from the camera 40. One basic task of the computer 48 is the management of the network 54, which connects to the several display drivers 56 at the several tee-off positions. These drivers 56 operate to drive their respective displays 58. They also can include electronics to generate selective signals on the network 54 such as in response to user inputs at user interfaces 60.

Figure 3:
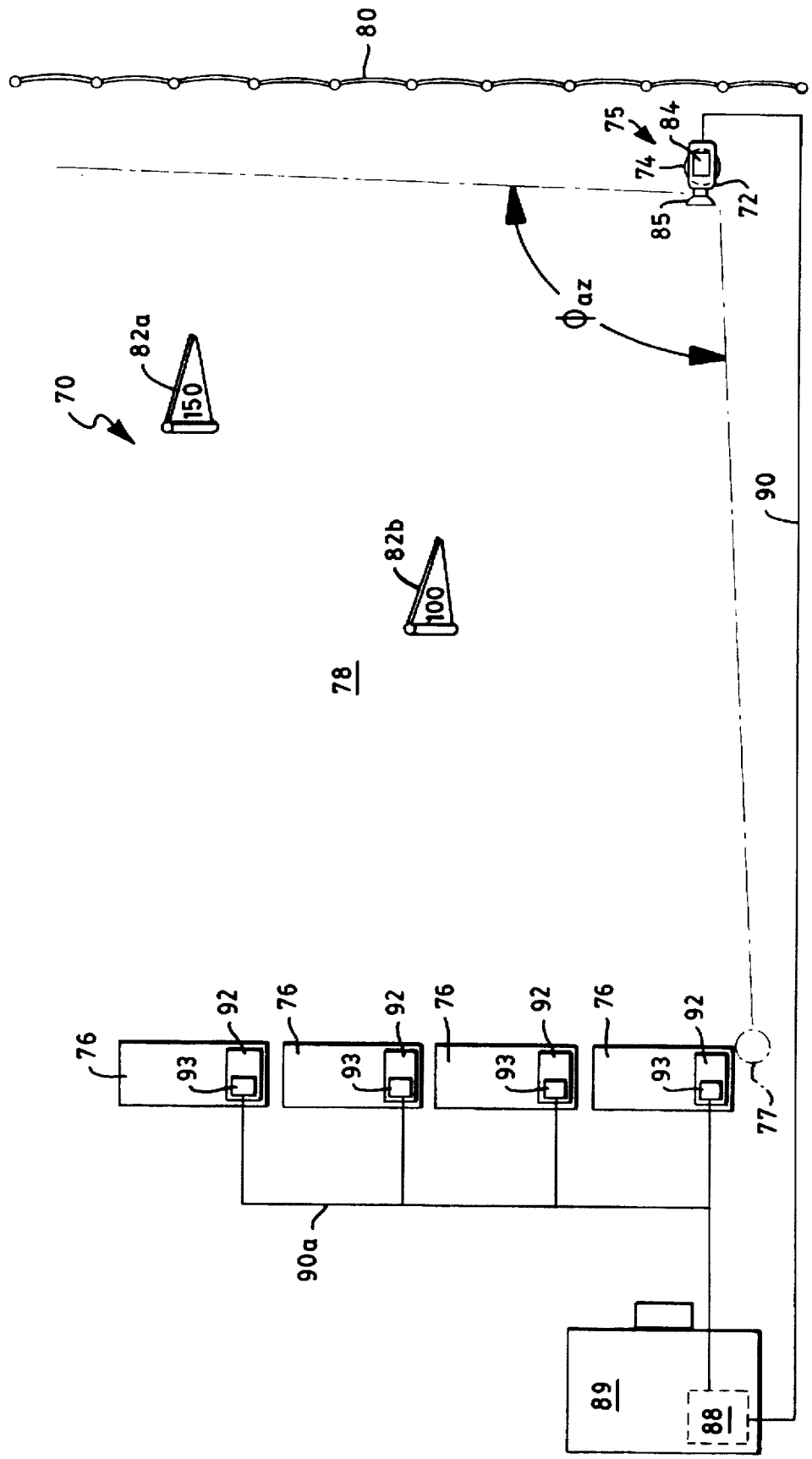
FIGS. 3 and 3A show, respectively, top and side views of a system constructed according to the invention for monitoring golf balls on a driving range.
Figure 3A:
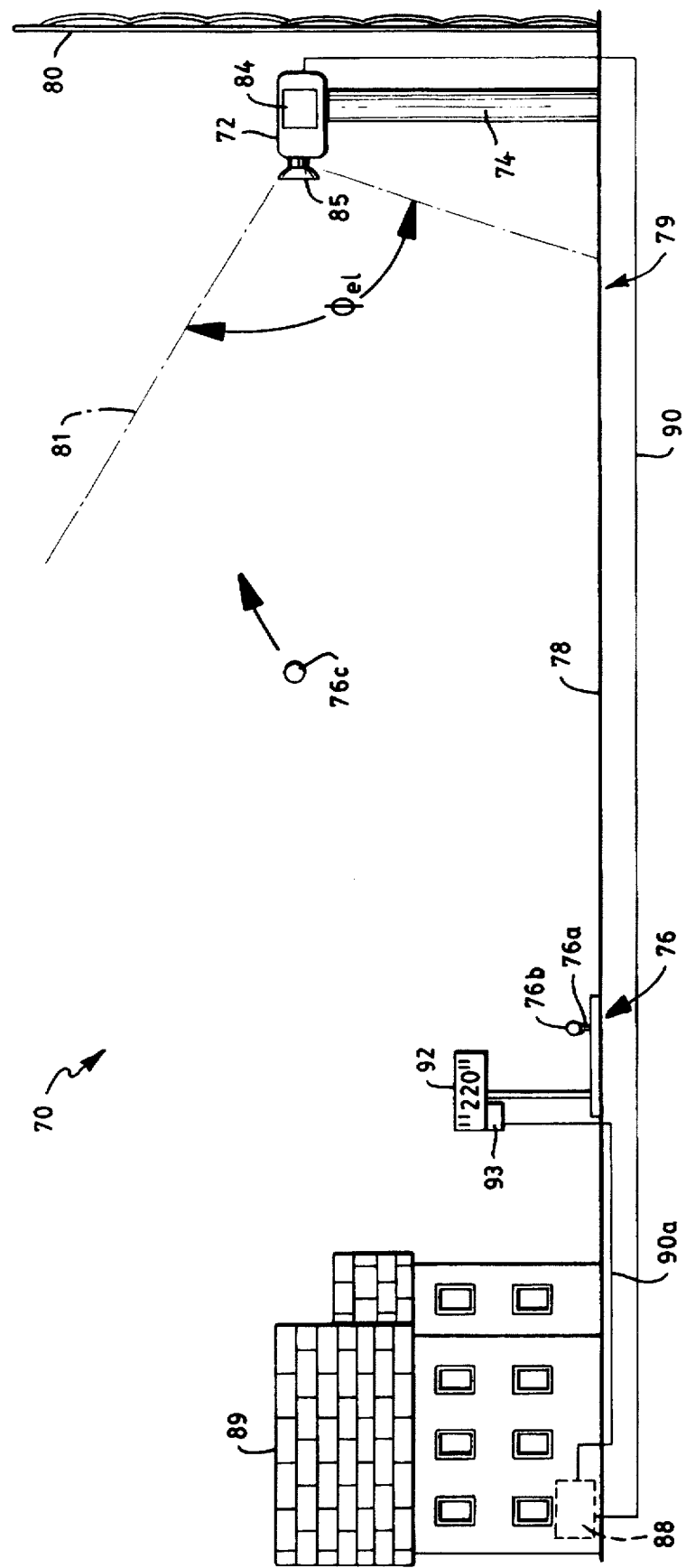

FIGS. 3 and 3A illustrate, in a top view and side view, respectively, a driving range 70 adapted with a data acquisition system 72 according to the invention. Preferably, the system 72 rests on a pole 74 so that it can view the users within the various tee-off positions 76 as well as the driving range ground 78 between the tee-off positions 76 and the net 80 (note for purposes of illustration that only four tee-off positions are shown in FIG. 3, when in reality several more exist; however, the invention can also be used to view a smaller number of positions 76, such as between one and ten, so as to reduce data processing requirements and to provide golf ball tracking information to a reduced user set). In a typical driving range, the distance between the users at the tee-off positions 76 and the net 80 is about two hundred yards.

The system 72 includes a camera 84 which has optics 85 with a focal length and aperture sufficient to achieve (a) the desired instantaneous FOV (i.e., the "IFOV" corresponding to the field of view of a single detector), (b) optical resolution (i.e., the blur caused by diffraction and geometrical effects as realized at the camera's focal plane), (c) appropriate signal-to-noise (S/N) for the camera's detector array, and (d) the desired field-of-regard $\phi_{az,el}$. The field of regard $\phi_{az,el}$ can extend to about 90°×90° in order to view a very large portion of the range 70 from the camera's position 75, including tee off positions 76, the ground 78, and the air above the ground 78 where balls 76c fly during flight. By way of example, azimuth $\phi_{az}$ in FIG. 3 extends from one end 77 of the tee off positions 76, to approximately the plane that is conincident with the net 80, which is about 90°. In FIG. 3A, on the other hand, $\phi_{el}$ extends from a position 79 below the system 72 (on the pole 74) to an acceptable line of sight 81 above the ground 78 to capture balls 76c that fly within $\phi_{el}$ (note in FIG. 3A that only one tee off position 76 is shown, for purposes of illustration; and includes a tee 76a and golf ball 76b thereon).

Figure 4:
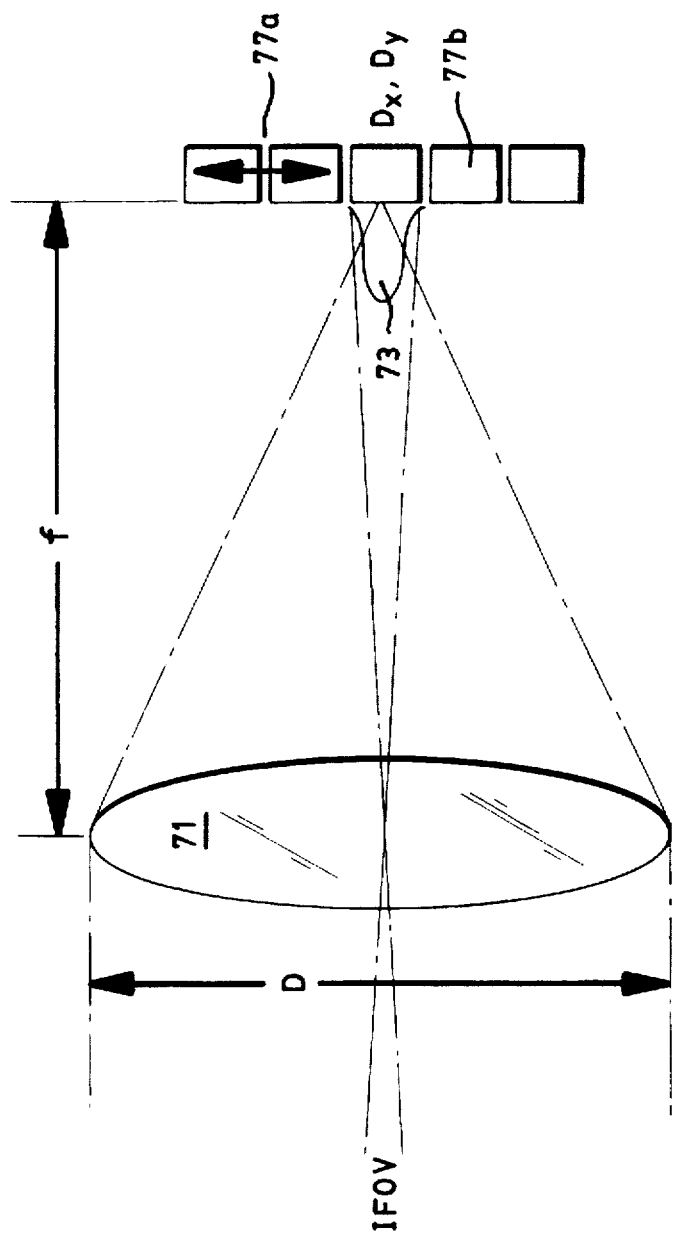
FIG. 4 illustrates certain optical characteristics used in selecting optics and detector elements in accord with the invention.

By way of background, FIG. 4 shows a simplified one-dimensional relationship between "IFOV," focal length "f", aperture "D," and optical blur 73 relative to an array of detector elements of size $D_x$, $D_y$. The optical element 71 illustratively represents the entire optical system 85 for a camera such as camera 84 of FIG. 3; and provides an overall field of regard to view the region being imaged. In FIG. 4, the element 71 has an aperture "D" that is generally circular; and that aperture forms a blur spot 73 for each point in the object field (e.g., the point spread function). If the element 71 is diffraction limited, then the spot's diameter is about 2.44λf#, where λ is the wavelength of operation and f# is equal to f/D. Typically the lens 71 is not diffraction limited because of the very wide field of regard. However, the optical prescription should, in general, be good enough to image a blur spot 73 to within the detector dimensions $D_x$, $D_y$ (or at least within the pitch 77a between adjacent detector elements 77b) so that the detectors 77b are chosen for their desired IFOV. The IFOV equals, in the respective axis, the detector dimensions $D_x$, $D_y$ divided by the focal length "f," to achieve IFOV$_{az}$ and IFOV$_{el}$, assuming $D_x$ corresponds to azimuth direction and $D_y$ corresponds to elevation direction.

By way of comparison, a golf ball at two hundred yards is about 0.2 milliradians, or 0.6° linear. In order to "match" one detector IFOV to one golf ball within φ would require about 15,000 elements in one dimension, which is unreasonable (in today's focal planes and processing capabilities). In accord with the invention, therefore, one golf ball at two hundred years has a geometric image that is smaller than the IFOV of the detector, to achieve practicality. However, this presents certain problems. First, since the ball only represents a fraction of the geometric image on a given detector, its signal relative to the background, e.g., the grass ground 78, is diminished. By way of example, if the detector IFOV is ten times the ball's angular extent, then the energy from the ball is approximately 1/100th of the total signal at the detector (an amount which is reduced further due to the ball's movement across several detectors). Fortunately, the ball's reflectance (due to its generally white appearance) is high, as compared to the ground 78; but that still means that the ball's contribution to energy should exceed the background noise (i.e., signal from the scene, detector noises, image processing electronic noises, digital sampling, etc.) in order to achieve a S/N≧1.0. Generally, therefore, there is a trade-off, according to the invention, which includes selecting a detector array that can achieve proper S/N and with respect to, for example, (a) reasonable data throughput issues (noting that processing requirements increase, sometimes dramatically, with the number of detectors in the array), (b) optical restrictions as to field of regard and aperture, (c) signal image processing that can sometimes compensate for certain technical deficiencies or limitations, and (d) costs associated with achieving a practical, commercial system.

There is also a positional uncertainty for a ball that is imaged to within a given pixel (that is, a ball's position is, to first order, known only to within the IFOV). In a preferred embodiment of the invention, therefore, sub-pixel resolution is achieved by considering the ball's track through several pixels, and/or frames, and extracting the most likely position of the ball within a given pixel based upon that track.

FIG. 3 also illustrates two sign markers 82a and 82a, such as known in the prior art to identify distance relative to the user, respectively "150" yards and "100" yards; and thereby illustrates a user's difficulty in assessing golf ball distances with any accuracy.

Note that the system 72 can be either (i) a solid state camera with on-board frame grabber capability, plus processing; or (ii) a video camera which transmits an analog signal to an in-house computer 88, which digitizes and analyzes the signal to determine distance. In either case, appropriate wiring 90 (which is digitally compatible in the first case; and analog compatible in the second case) connects the system 72 to the computer 88 (typically within a club-house or other suitable location 89). The computer 88, such as described above, connects to a plurality of displays and drivers 92, 93 at each tee-off position 76 (note, again, that FIG. 3A illustrates only one display 92 for purposes of illustration) through network wiring 90a. The displays 92 are used to inform the user of information such as distance associated with hitting the golf balls 76c, 76b into the range 70.

Figure 5:
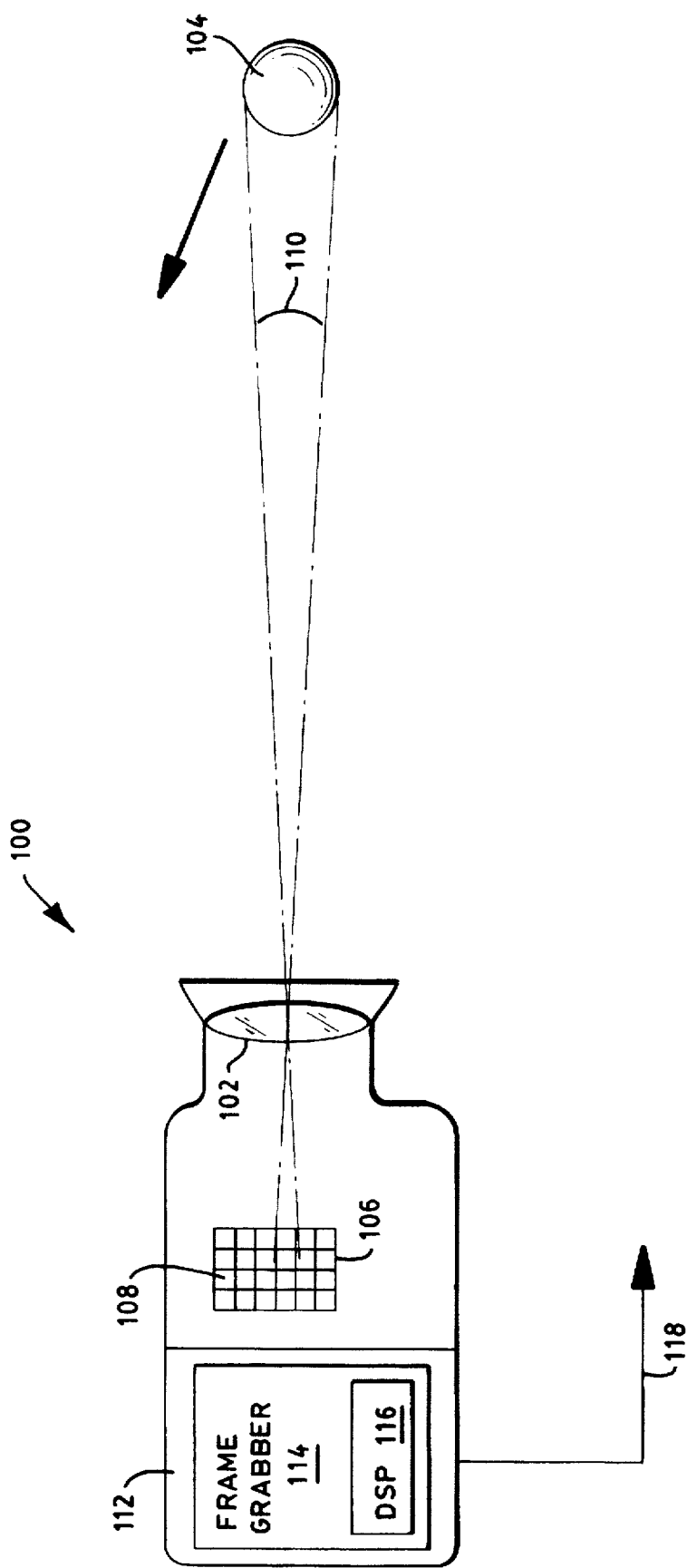
FIG. 5 illustrates a camera processing system, constructed according to the invention and suitable for use in a system such as shown in FIGS. 1, 3, and 3A.

FIG. 5 illustrates a system 100, similar to system 72 of FIG. 3, which includes detector optics 102 which image the scene (e.g., the golf ball 104) onto the focal plane 106. The focal plane 106 has an array of elements 108, sized to provide an IFOV 110 that enables detection of a golf ball at about about one-hundred yards, or further. A data processor 112 connects and/or controls a frame grabber 114 so as to capture successive image frames of the scene, such as to view and analyze the image of the golf ball 104 moving through the range 70, FIGS. 3 and 3A. In this embodiment, an on-board processor 116 provides real-time graphic analysis of the data taken by the frame grabber so that, in combination with the data processor 112, distance information for golf ball travel can be sent across the communication line 118 and to the connected user displays, such as the LCDs 28 of FIG. 1.

Those skilled in the art should appreciate that certain changes can be made with respect to the system 100 of FIG. 5, and other systems herein, without departing from the scope of the invention. For example, the processor 112 can be replaced in functionality by another computer connected to the system 100 via a data link 118, such as by the computer at the club house (e.g., computer 24, FIG. 1).

Figure 6:
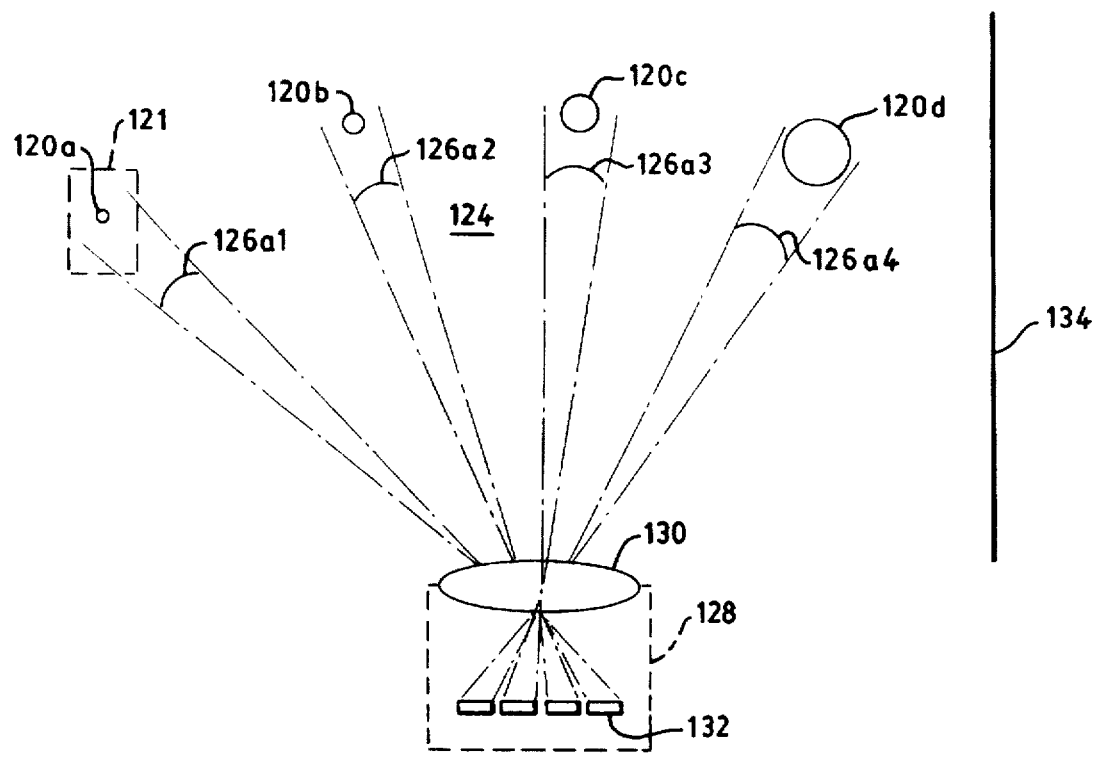
FIG. 6 schematically illustrates golf ball tracking through successive detector IFOVs in accord with the invention.

FIG. 6 illustrates a golf ball 120 being tracked (in one dimension, for illustrative purposes) by a system of the invention once hit from the tee-off position 121 and across the range 124. For illustrative clarity, only four positions of the golf ball are shown at different times, starting at position 120a and ending with position 120d. The IFOVs 126a1–126a4 represent different detector IFOVs which view the ball 120 at the various positions 120a–120d as it flies through the air and/or bounces on the ground. The data acquisition system 128, here shown only as optical element 130 and detector focal plane elements 132, collects the golf ball's movement in successive frames as it travels from the tee-off 121 to the net 134. As discussed in more detail below, the ball 120 can travel through more than one IFOV during a given frame. This provides certain advantages such as assessing the image smear generated by one golf ball within a given frame.

Note in FIG. 6 that the IFOV 126 remains substantially equal throughout the ball's flight; however, the ball's respective size gets larger, as compared to the IFOV 126, because the ball 120 is getting closer to the system 128. Accordingly, the golf ball 120a generates a much smaller signal at IFOV 126a1 as compared to its signal at IFOV 126a4. That is, the image of the ball 120a within IFOV 126a1 is relatively small as compared to the image of the ball 120d within IFOV 126a4. As such, the contribution from the background (e.g., the signal generated from the range) is relatively high for IFOV 126a1 as compared to IFOV 126a4. Likewise, the signal from the ball 120 increases dramatically during flight, and so the S/N for a given ball, during flight, also generally changes.

In accord with one preferred embodiment of the invention, the ball's signal is first "calibrated" at the tee off position 121 (which is at a fixed, known position relative to the system 128); and this calibrated signal is compared to the signal from the ball 120 during its flight so as to determine distance to the golf ball. This is extremely valuable since knowing the distance to the camera places the ball 120 within 3-D space (as opposed to 2-D, flat space); and certain boundary conditions can be imposed on the solution space (by way of example, if the distance to the ball as determined by a given pixel corresponds to the distance to the ground, then that ball just "hit" the ground). Knowing the ball's position in three dimensions is also advantageous as to discriminating between two or more balls crossing paths on the FPA. As described in more detail below, 3-D isolation of ball location can also be done with multiple sensors/cameras.

Note that the calibration cycle has another benefit: golf balls at driving ranges have different reflectance characteristics: some are dirty and less reflective; others are new, clean and thus more reflective. If the signal strength of the ball is calibrated at the tee-off position, then the calibrated signal is used in a relative sense for subsequent distance comparisons.

With further reference to FIG. 6, assuming constant illumination from the ball 120, and assuming that the ball subtends a geometric image that is less than the IFOV of a given detector, then the energy from the ball 120 is functionally dependent upon $1/R^2$, where R is the distance from the ball 120 to the sensor 128. In particular, well known radiative energy transfer equations show that the ball's flux energy at the optical aperture 130, $\Phi_{sensor\text{-}optics}$, obeys the following equation (See, Derniak & Crowe, Optical Radiation Detectors, John Wiley & Sons (1984)):

$$\Phi_{sensoroptics} = \frac{L^{ball} A_{ball} A_{optics}}{R^2}$$

wherein $L^{ball}$ is the radiance from the ball 120. Note that since the ball is substantially lambertian, and assuming constant illuminating intensity such as from the sun or night lighting, then $L^{ball}$ is constant. Accordingly, the signal flux, $\Phi_{sensor\text{-}optics}$, increases as the ball 120 approaches the sensor 128. At the tee off position 121, therefore, if the sensor 128 determines that the ball's signal intensity is $S_1$, corresponding to two hundred yards, then the ball is one hundred yards away when the signal is four times greater. Again, the determination of the ball's position in three dimensions is extremely useful in terms of placing practical limitations on the ball's position and in determining other factors such as ball height and proximity to the ground.

The above relationship holds true until the ball becomes an extended source relative to the detector size. In other words, once the detector IFOV approximately equals the angular subtense of the ball 120, then the ball's signal will no longer increase as the ball gets to the sensor. In this latter case, the irradiance, $E_{detector}$, at the detector is substantially constant because of imaging:

$$E_{detector} = \pi L^{ball} \sin^2\theta_{1/2} \approx \frac{\pi L^{ball}}{4f\#^2}$$

where $\phi$ is related to the numerical aperture. Note that there is no longer a dependency on "R."

However, once the ball 120 becomes an extended source relative to the IFOV 126a, then several detectors can be averaged together to determine, in combination, the signal from the ball 120, and hence the distance to the ball 120.

Figure 6A:
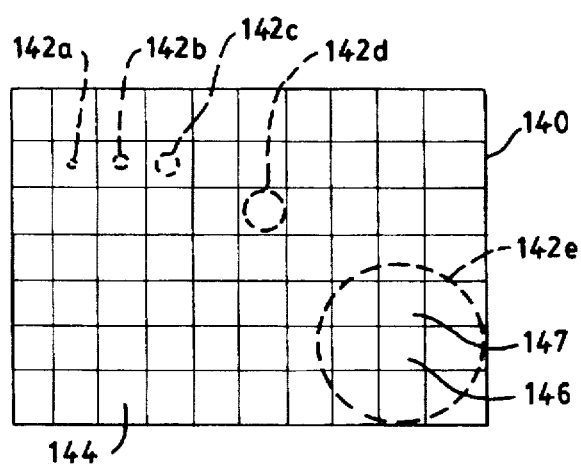
FIG. 6A illustrates determining distance the golf ball as a function between IFOV, ball reflecting energy, and angular subtense of the ball.

FIG. 6A illustrates the relationship between ball size and signal strength, in accord with the invention. A FPA 140 is illustratively shown in FIG. 6A as a representative solid state detector array; and a ball's motion is sequentially captured during image framing as images 142a, 142b, 142c and 142d. Note that the ball's overall image size, relative to the pixel IFOV dimensions 144, at positions 142a–142d changes during the flight. At images 142a, 142b and 142c, the ball subtends an angle that is smaller than the IFOV; and therefore the distancing functionality as to $1/R^2$ applies. At image 142e, the ball image is much larger than a given IFOV so that, for example, detectors 146 and 147 image the ball with the same approximate image strength. However, neither detector 146, 147 is used, alone, to determine distance. Therefore, the signal strengths from all of the detectors which image ball 142e are summed to determine a signal strength; and that signal strength can be used to determine distance.

The analysis above neglects certain key factors, such as: diffraction, ball motion, ball images that cross between two detectors, simultaneous imaging of two balls crossing within the field of regard, optical blur and defocus, and similar effects. At image 142d, for example, the ball image and pixel dimensions are approximately equal. At this special condition, neither technique works particularly well. Nevertheless, there are acceptable solutions to these problems: a combination of the above techniques can be used, the distancing data can be ignored for selected failure conditions, diffraction effects can be included by summing adjacent detectors, and estimation routines can "bridge" certain data by considering past data, future expected data, and certain physical constraints.

Figure 6B:
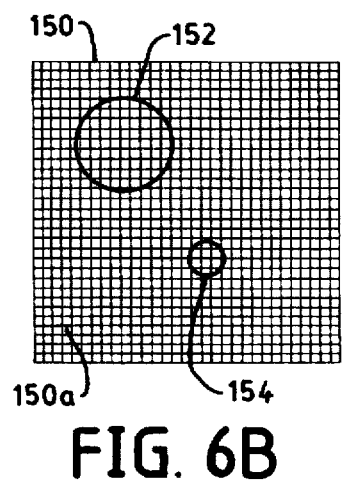
FIG. 6B illustrates geometric sizing of a ball on a focal plane in order to determine golf ball distance.

FIG. 6B illustrates that golf ball distance can also be determined geometrically because the ball's size is a constant. In particular, if the focal plane 150 is sufficiently dense in IFOV pixels 150a, as compared to the geometric image of the ball over the range, such as illustratively shown by golf ball images 152, 154 (image 152 denoting a "closer" golf ball due to its larger image size; and image 154 denoting a "further" golf ball due to its smaller image size), then the distance to the ball can be determined by a ratio. That is, by calibrating the number of pixels which correspond to a ball's width at, for example, the tee-off position (being at a fixed, known distance from the camera), then subsequent frames readily specify golf ball distance, from the camera, by a ratio between the numbers of detectors which image the linear dimensions of the ball (e.g., if eight detectors image the ball at fifty yards; then sixteen detectors image the ball at twenty-five yards).

Figure 7:
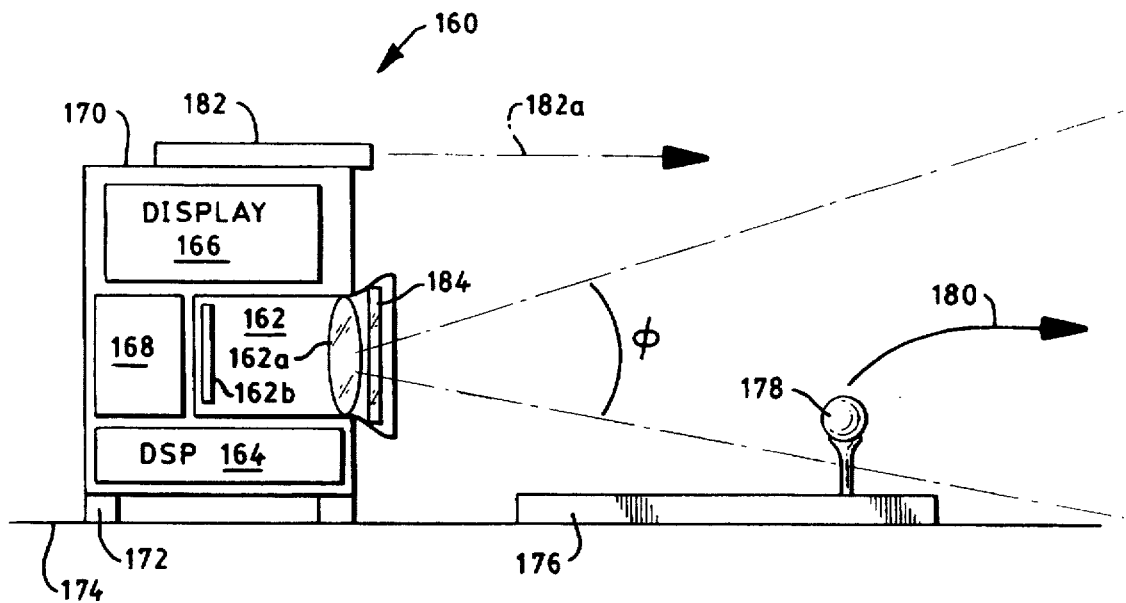
FIG. 7 illustrates a portable golf distancing tracker constructed according to the invention.

The technique of FIG. 6B generally requires a very high density focal plane, in the megapixel realm, which adds to the processing complexity and overall system cost. However, it can also be used, with significantly fewer pixels, in a portable tracking system such as shown in FIG. 7. In FIG. 7, a portable tracker 160 includes a solid state camera 162 (illustrated with optics 162a and FPA 162b), processing electronics 164, a display 166 and power source 168 to drive the components 162, 164 and 166 within a portable mounting frame 170. One or more legs 172 are used to mount the tracker 160 on the ground 174 and adjacent to a tee-off position 176 so that the camera 162 can view, within its field of regard φ, the ball 178 and a typical track 180 of the ball 178 leaving the position 176. In this manner, the tracker 160 initially calibrates on the size of the ball 178 as initially imaged to the FPA 162b relative to the number of pixels used at position 176 (such as in FIG. 6B) and keeps track of golf ball distance along the track 180 and relative to the tee-off position (that is, the further from the tee-off position 176, the smaller the image of the ball 178 becomes, which correlates into distance traveled). The processor 164 determines this distance and generates a display signal on the display 166. By way of example, if the ball 178 is imaged to one hundred pixels at the tee off position, and the ball 178 is one yard away; then the ball 178 is ten yards away on the track 180 when ten pixels correspond to the image of the ball 178 (again, the ball size is constant).

FIG. 7 also illustrates selected options, such as an active pulsed laser source 182 and filter 184 matched to the source 182. The laser 182 is used to illuminate the ball 180 during its travel and at known periodic intervals (to conserve power and to improve detection by looking at a signal with a known frequency); and the filter 184 is used to isolate the wavelength of the laser source 182, again improving signal discrimination. By pulsing the laser light 182a to illuminate the ball 178 on the track 180, the camera 162 readily tracks the signal with improved discrimination; and the signal generated by the reflection off of the ball 178, over distance, is used to calibrate the ball's overall distance from the tracker 160. Again, the ball 178 is first calibrated at its initial start position at the tee 176, in terms of the amount of energy reflected from the ball 178 as pulsed from the laser 182 and/or through geometric sizing. After the ball 178 is hit, the energy again drops off as $1/R^2$, which is very accurately measured by the active nature of the source 182 and detection scheme of this embodiment.

The tracker 160 of FIG. 7 has several advantages. First, it is portable and golfers can set the tracker 160 adjacent to their selected practice site, including within your own backyard. The tracker 160 operates to determine distance and other characteristics such as described herein in connection with driving range monitoring (e.g., club statistics, slice and draw information, and determining where the ball would have gone had it not been stopped by artificial means, e.g., a net or wall).

Figure 8:
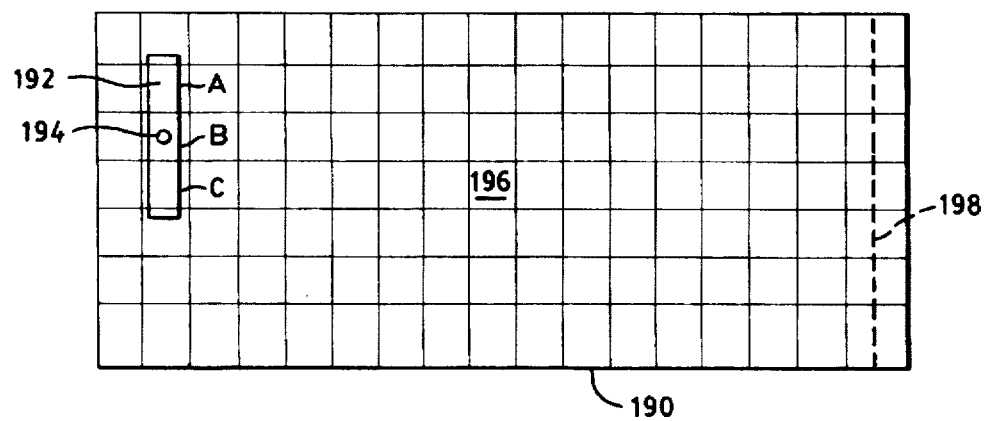
FIG. 8 shows, illustratively, a frame of data that images a representative driving range.

FIG. 8 illustrates one embodiment of determining distance of a golf ball, in accord with the invention; and specifically illustrates a frame 190 of image data. For ease of illustration, FIG. 8 is shown schematically as a top view in two dimensions; when, in reality, the view of the camera onto the range is skewed, or perspective, and thus so is the frame 190 of image data. In FIG. 8, the tee-off position 192 is imaged to pixels "A," "B" and "C" of the associated camera system (e.g., the camera system 100 of FIG. 5). Thus, when the system of the invention "sees" motion in the pixels "A," "B" and "C" it knows that the track of a golf ball originating from that location belongs to the associated user; and that the final distance measured for the golf ball 194 hit into the range 196 should be sent to that location 192 and the associated LCD 194. The pixels A,B,C relative to the physical dimensions of the tee-off position 192 and ball 194 are not to scale. Note that the frame 190 preferably includes the tee-off position 192, the range ground 196, and the net 198, which means that the associated camera (not shown) should view that entire field of regard.

Figure 8A:
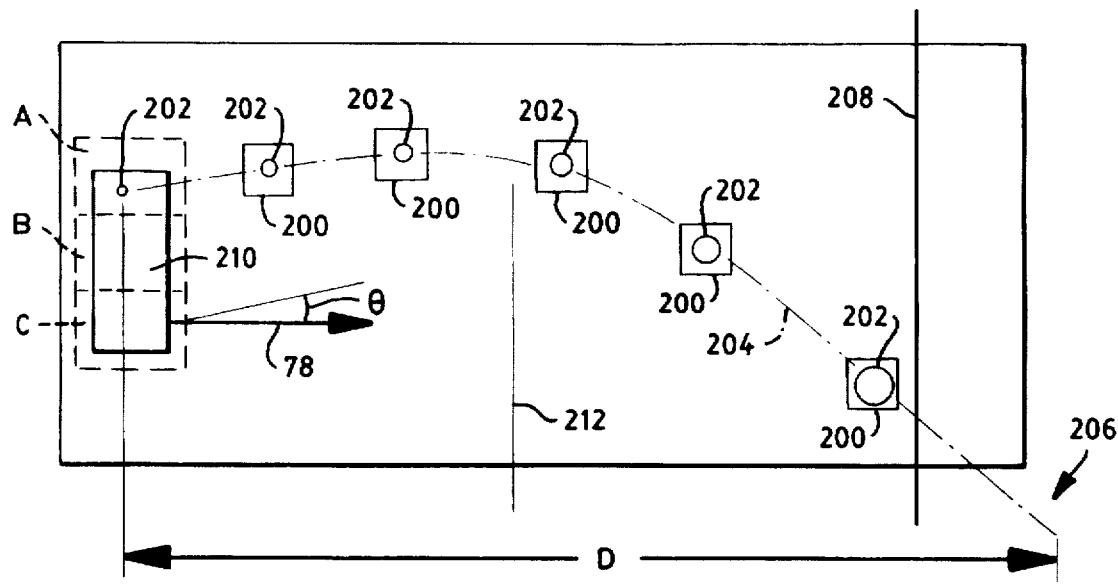
FIG. 8A shows, illustratively, successive frames of data imaging motion of the golf ball after a player hits the ball off of a tee, in accord with the invention.

After the ball is hit, the system of the invention tracks movement such as shown in FIG. 8A. Note that for successive frames, here shown as single pixel images 200 of the ball 202, the system tracks the overall motion of the ball 202, which in general follows an arc-like pattern 204 through the range 199. As such, it is without excessive processing that the system of the invention can determine overall distance "D" to the final destination 206 of the ball 202 even though the ball 202 hit the net 208. That is, the arc 204 is curve fit to determine the distance "D" hit by the appropriate user at tee-off 210. This determination can occur at any time, provided that there is enough frame data to make such an assessment. For example, the arc 204 determined by the time the ball 202 reaches position 212 is probably sufficient to determine overall distance "D" yet to be traveled. Accordingly, a user can be notified of the expected travel distance "D" before the ball actually reaches that location 206.

The system can also determine and inform the user of the angle for which he hit the ball, such as in a slice pattern, by following the ball's track and comparing that to the approximate normal 78 to the tee-off position 62, here shown illustratively as angle φ.

Figure 9:
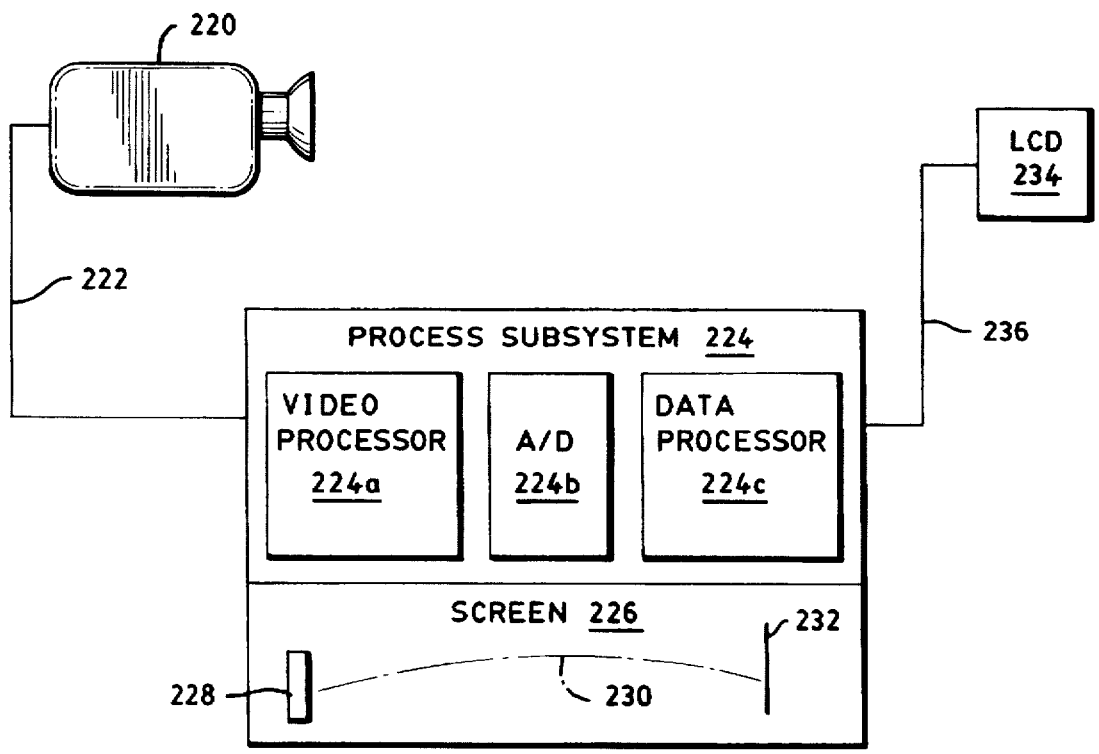
FIG. 9 illustrates a system, constructed according to the invention, for tracking golf ball motion with an analog camera.

FIG. 9 shows a video camera 220 that is arranged, for example, such as on the pole 18b of FIG. 1. A video cable 222 connects to a processor subsystem 224 which houses a video processor 224a, A/D converter 224b, and data processor 224c. The subsystem typically resides, for example, in the club house next to the driving range, where management can watch the video on a display screen 226. The camera 220 is arranged to view the driving range so that, for example, a tee-off position 228 is shown and a golf ball travel arc 230 can be determined between the tee off position 228 and the net 232. The A/D converter 224b converts the camera's analog video signal to digital so that processing of the image can occur within the subsystem 224 to determine, for example, the distance "D" such as shown in FIG. 4A. In addition to distance, other information can also be determined, e.g., slice information, and the requested information is relayed to the associated LCD 234 by way of cabling 236 (by way of example, the LCD 234 corresponds to the display at tee-off position 228).

Figure 10:
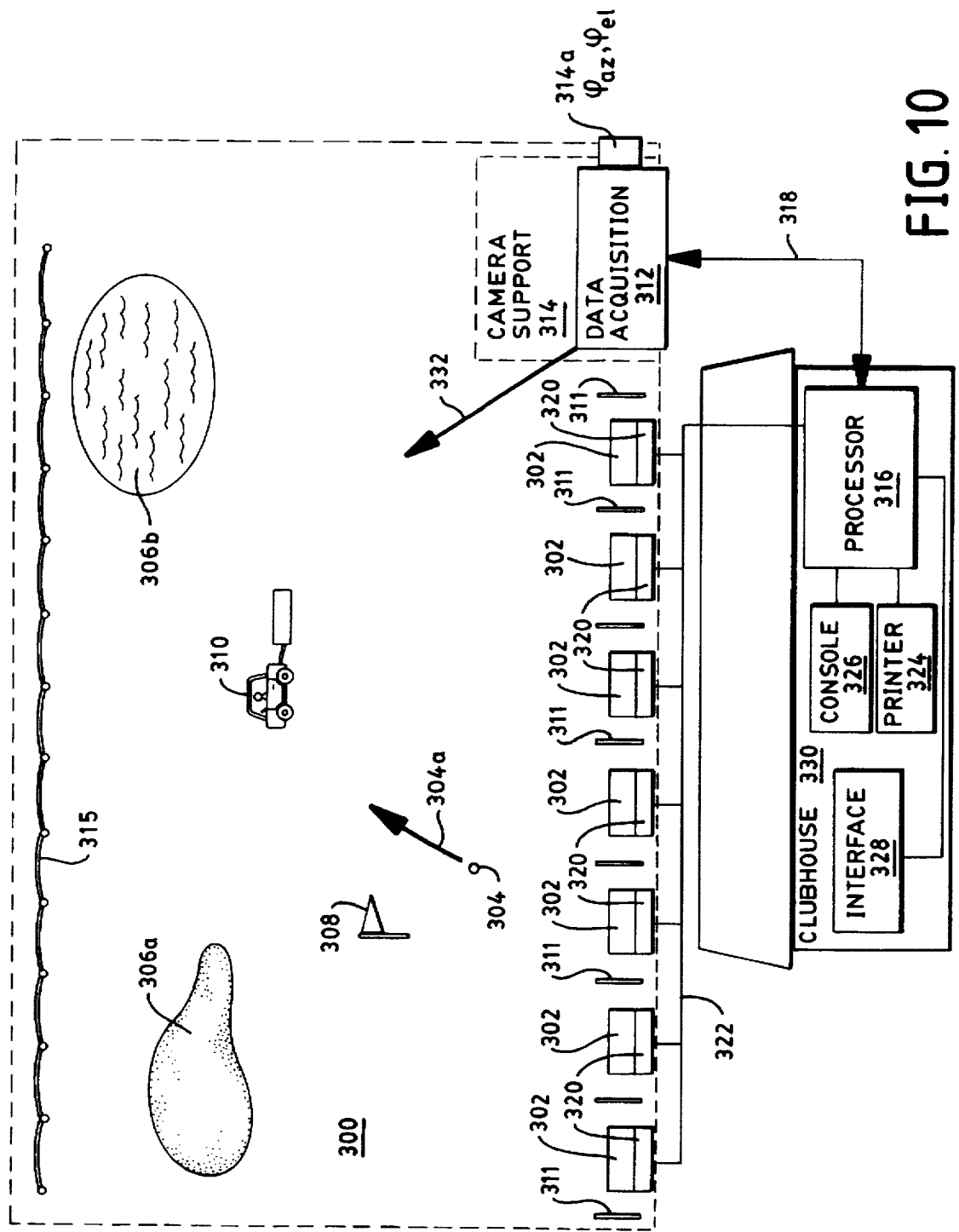
FIG. 10 illustrates another range system constructed according to the invention.

FIG. 10 illustrates another embodiment of the invention as installed at a driving range 300. The golf players at one or more tee-off locations 302 hit golf balls 304 into the driving range 300. Items located in the driving range 300 include water hazards 306b and sand traps 306a, pin targets 308, and ball retrieval trucks 310. The data acquisition subsystem 312 collects scene imagery from the driving range 300, converts it to electrical energy, and then processes the resulting electrical signals so as to identify and locate all balls 304 moving within the driving range 300. The support structure 314 physically holds the subsystem 312 in a position where it can view, preferably, the full driving range 300 (alternatively, if the subsystem 312 does not view the entire range 300, additional subsystems 312 can be installed to view the range 100, if desired, so as to image the entire range 300).

Connected to the subsystem 312, the processor 316 analyzes the ball targets 304 to determine one or more of (a) the tracks 304a that the balls 304 are following, (b) the origination point for each track, (c) the distance each ball flies to its first bounce, and (d) the total distance that the ball traveled before coming to a stop. The processor 316 further does one or more of the following: (a) analyzes the shots made by each golfer, (b) produces golfer reports, (c) produces system usage reports, (e) produces system health reports, and (f) performs other system activities.

The system bus 318 transmits the ball target information from the subsystem 312 to the processor 316. The reporting stations 320, located at each golfer tee position 302, display reports to the individual golfers and provide means for the individual golfers to make requests to the processor 316. The bus 322 transmits requests from the reporting stations 320 to the processor 316; and the bus 322 further transmits reports from the processor 316 to the report stations 320 (alternatively, as known in the art, the bus 322 can be made from a plurality of separate bus lines; preferably, however, the bus 322 is combined into a single bi-directional data bus). The printer 324 provides printed reports of the individual golfer sessions, player identification cards and summaries of system usage. The subsystem console 326 is used to command system operating modes, and provides a wide range of system monitoring capabilities. The external interface 328 provides a means to remotely monitor and communicate with the subsystem 312. A structure 330, such as the driving range club house, provides shelter and the necessary physical room for the processor 316, subsystem console 326, printer 324, and external interface 328.

A support structure 314 preferably positions the subsystem 312 at a sufficient elevation so that its view of golf balls (e.g., the ball 304) lying on the ground are not obstructed by other balls, blades of grass, or the varying elevation of the range terrain. In addition, the subsystem 312 is elevated sufficiently so that the tee station partitions (illustratively shown as dotted lines 311) do not obstruct the camera's view to golf balls 313 resting on tees at the tee stations 302. It is further desirable that the subsystem 312 elevation is high enough so as to view, downwards, golf balls that are hit high into the air so that the view of the ball is not seen within the sky, which makes ball resolution difficult. Accordingly, subsystem 312 elevation is typically in the range of fifty to one hundred feet above the ground. While the support structure 314 can be located at any position within the driving range 300, one preferable location is adjacent to the golfer tee areas as shown in FIG. 10. Another preferred location is adjacent to the net 315, such as shown in FIG. 1. However, by looking outward into the range 300, such as shown in FIG. 10, the camera subsystem 312 takes advantage of the lighting normally present at driving ranges during daytime and nighttime operations.

The support structure 314 may further include a gimbal assembly 314a for aligning the camera subsystem's 312 line of sight, in azimuth $\phi_{az}$ and elevation $\phi_{az}$, to the driving range 300. The processor 316 commands the gimbal movement in response to inputs at the interface 328. The gimbal assembly 314a provides a means for pointing the camera subsystem 312 over a wide range of angular directions along with a locking feature for holding the camera subsystem 312 at any desired orientation within the gimbal's range of motion.

One preferable orientation for the camera subsystem's line of sight 332 is oriented down from the horizon ~45° and rotated ~45° from the line of golfer tees 302, such as shown in FIG. 10. Other considerations for camera orientation and placement should include the viewing angles to the sun. For northern hemisphere applications, for example, northerly view angles are preferable to avoid solar blinding of the camera electronics while the opposite is true within the southern hemisphere. The support structure 314 may also provide means for mounting of lighting fixtures (not shown) that would provide illumination of the driving range 300. The lighting fixtures may be positioned above the camera subsystem 312 so as to prevent flying insects that are attracted to the light from appearing in camera frames and being incorrectly identified as ball targets. Further, the light emitted from the lighting fixtures should preferably be of a wavelength which does not attract insects.

Figure 11:
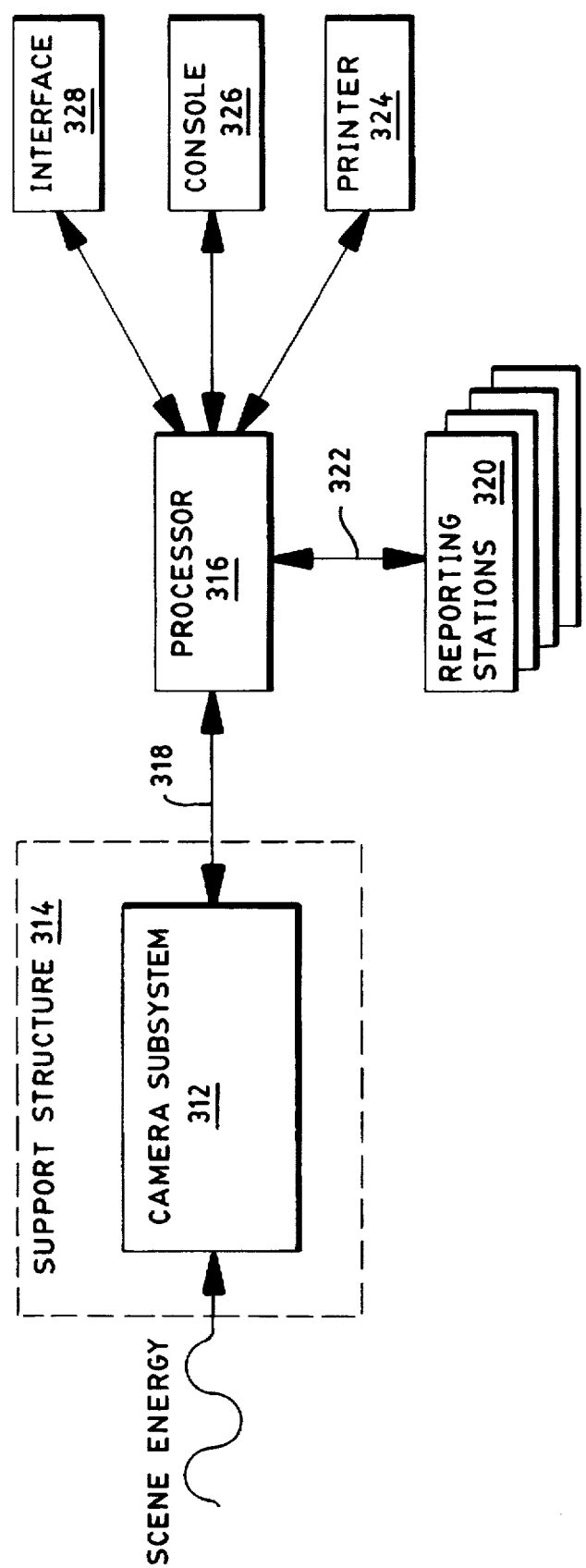
FIG. 11 shows a functional block diagram of the system of FIG. 10.

A functional block diagram of many of the main elements of the embodiment of FIG. 10 is shown in FIG. 11. The camera subsystem 112, held by support structure 114, receives energy from the range 300 and the golf balls 304 so as to distinguish those balls and track them to determine information such as distance. The camera subsystem 312 connects to the processor 316 through the bus 118. The processor 316 further connects to the reporting stations 320 through bus 322. An optional printer 324, console 326 and interface 328 also connect to the processor 316 which has overall control over the system of FIGS. 10 and 11.

Figure 12:
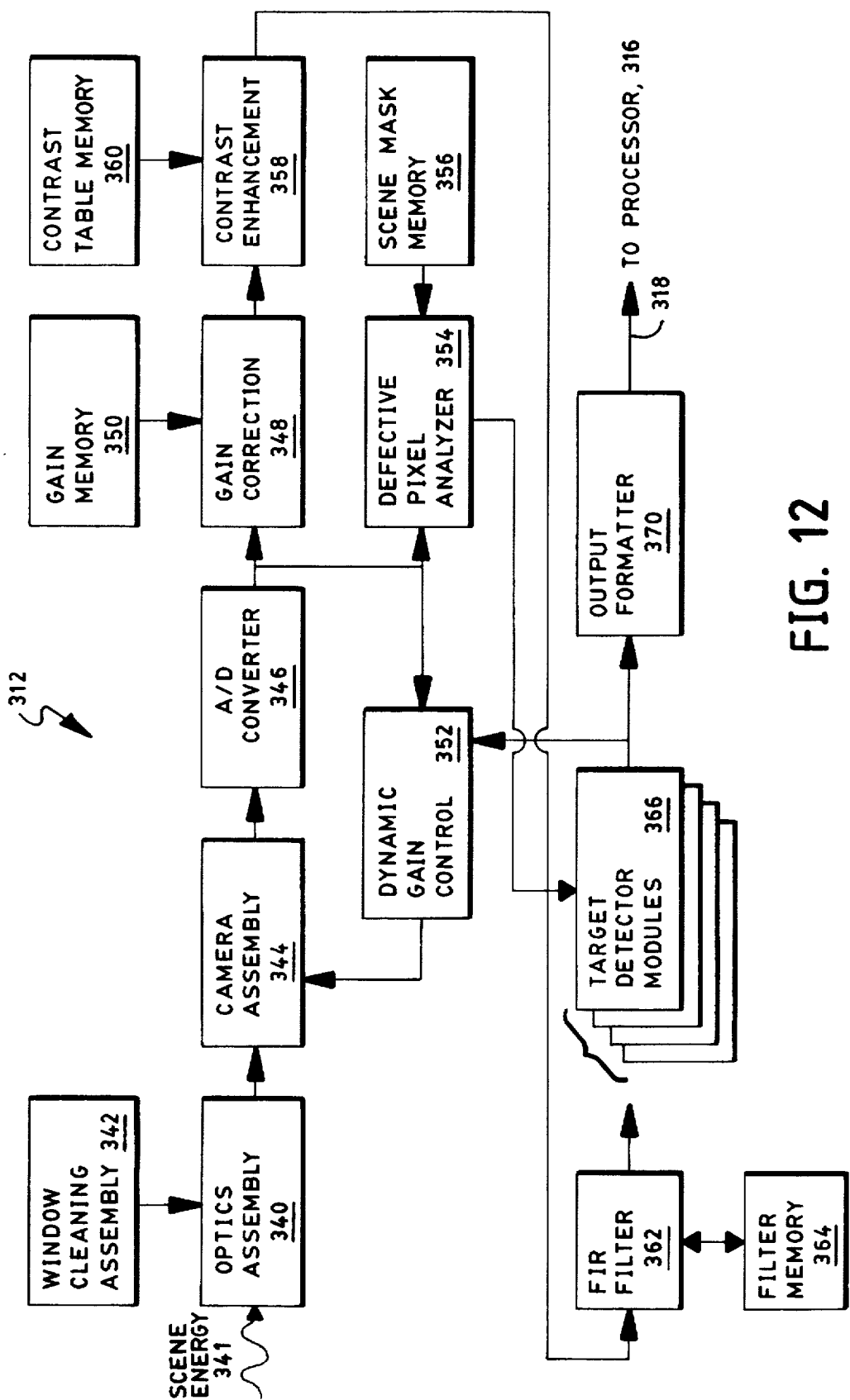
FIG. 12 shows a functional block diagram of the camera subsystem of FIGS. 10 and 11.

A functional block diagram of the camera subsystem 112 is depicted in FIG. 12. The optics assembly 340 collects scene energy and forms an image of the scene at the camera's focal plane, e.g., a solid state focal plane such as Kodak's KAI or KAF CCD imaging arrays. The optics assembly 340 provides a wide angle field of view, typically 90° in both azimuth and elevation, to image the driving range field of play, e.g., the range 300 of FIG. 10, with a single camera subsystem 312. Anti-reflective coatings are preferably applied to the optical elements to maximize the signal presented to the camera subsystem 312.

A window cleaning assembly 342 provides a means to remove dust, dirt, and other contaminants that may accumulate on the optic's assembly 340 external window through which the scene energy 341 is transmitted. The assembly 342 preferably includes a wiper blade, wiper blade motor, cleaning fluid nozzle, cleaning fluid reservoir, fluid transport tubing and fluid pump, such as known to those skilled in the art. In response to a command issued by the camera subsystem 312, or by the ground station processor, e.g., the station processor 316 of FIG. 10, the fluid pump draws fluid from the reservoir and imparts a high pressure to the fluid causing it to stream out of the nozzle. The nozzle is positioned so that the fluid leaving the nozzle is directed to the optic's assembly external window. The pump is active for a short period of time (e.g., 2–5 seconds), and then the wiper blade motor is activated causing the wiper blade to sweep across the window in an oscillatory motion to clear the window. After a preset number of oscillations, the wiper blade motor is brought back to a rest position so that the wiper blade does not obstruct the clear aperture of the camera subsystem 312.

The camera assembly 344 converts the optical image presented by the optics assembly 340 into electrical signals. The camera assembly 344 typically includes a two dimensional array of pixels such as that provided by a CCD. Each pixel creates an electrical signal proportional to the amount of light power incident upon it. The camera assembly 344 also includes a buffer amplifier so as to present a high impedance source to the external electronics and also includes a selectable and commandable analog amplifier stage to adjust the level and amplitude of the output signal. The pixel signals are output from the camera 344 in a single or multi-channel serial data stream. The camera 344 includes the timing and control electronics necessary to properly operate the CCD array. The camera 344 also outputs timing signals to allow downstream electronics to synchronize their operation with the camera's operation. The camera 344 may receive an external clock signal to which it will synchronize its operation. The camera may also receive a signal for selecting exposure time, operating frame rates and analog gain for the camera 344.

The A/D assembly 346 converts the analog signal output from the camera 344 into a parallel digital signals. The gain correction module 348 receives the individual digital values for each pixel and applies individual, factory determined, gain corrections stored in the gain memory 350 to each pixel value so as to improve the response uniformity of the camera subsystem 312.

The dynamic range control module 352 receives the digital pixel signals from the A/D converter 346 and target amplitudes from the target detectors 366 and determines the optimum exposure time for the camera 344. The module 352 generates an electrical signal indicating the selected exposure time and transmits that signal to the camera assembly 344. Strategies for selecting the optimum exposure time can include (a) adjusting the exposure time so that a predefined percentage of the targets appear at a high enough signal level so as to saturate the A/D converter 346 or (b) adjusting the exposure time so that the number and arrangement of saturated scene pixels is maintained below a preset threshold.

The defective pixel identification module 354 receives the digitized pixel signals from the A/D converter 346 and continuously calculates the temporal noise of individual pixels. Pixels whose noise fall above a preset threshold are flagged as defective. Pixels whose noise characteristics change over time may be intermittently identified as defective. The noise threshold can be adjusted by processor or internal module logic for compensation, as needed. In addition, the module 354 accesses the scene mask memory 356, which identifies pixels that are permanently labeled as defective because of poor performance or to mask out distracting features in a particular portion of the scene 341. The internal address of any pixel deemed to be defective for any reason is transmitted to the target detection modules 366.

The contrast enhancement module 358 provides re-mapping of pixel signals so as to improve the image contrast. The re-mapping is accomplished using the contrast table memory 360, using the pixel's current value as an index into the table 360; and the value residing at that index is then used as the new value for the pixel. The contrast table 360 may be factory programmed or may be developed dynamically by the subsystem 112.

The FIR filter 362 applies a digital temporal high pass filter to each individual pixel; in effect, there is one FIR filter for each pixel. The signal produced by moving balls will be passed by the filter 362, though the signal will be somewhat distorted as a result of the filter's temporal spectral response. For stationary balls and static portions of the scene, no signal will be passed through the filter 362. The filter time constant is adjusted so that a ball that is stationary for more than about three (3) camera frames is not passed through the filter 362. The filter 362 uses the filter memory 364 to maintain the past history of each pixel for subsequent use by the filter 362.

The target detector module 366 receives the filtered digital image from the FIR filter 362, and a list of defective pixels from the defective pixel module 354. A ball that appears against a low background produces a positive signal, while a ball that appears against a bright background produces a negative signal. The filtered image is compared to a threshold value and any pixel whose filtered signal exceeds the threshold in a negative or positive sense is identified as a target and its filtered signal level is retained. The detection threshold may be set in an adaptive manner to limit the number of false detections and may also be adjusted based on the current lighting conditions.

Next, the target pixels for the current frame are compared to the defective pixels, and any target found to be within a defective pixel is removed from the target set. Moving balls that are sufficiently close to the subsystem 312 will produce targets in more than one pixel (i.e., those targets greater than the IFOV) while moving balls that are further away will produce targets in a single pixel only (i.e., those targets within IFOV). Other targets will also generate multi-pixel targets such as the golfers themselves and the ball retrieval cart 310, FIG. 10. To distinguish between balls and other moving objects, the target set is first analyzed to locate contiguous targets. Two targets are said to be contiguous if their pixels share a corner or edge. Next, objects are formed from the contiguous targets by comparing each pair of contiguous targets to all other contiguous targets in an iterative manner; and any contiguous targets that share a common pixel are defined as an object. Next, each object is compared to all of the other current objects. When two objects are found to share a common pixel, then these two objects are combined into a single object. This process is repeated in an iterative manner until no more objects can be combined. Next the extent of each object in pixels is determined by evaluating the pixels that make up the object.

Any object having an extent equal to or less than a threshold value is identified as a ball object; while objects having an extent greater than the threshold are considered other objects. The total signal of each ball object is then determined by forming the algebraic sum of the signals from each of the pixels that make up that ball object (note, for example, that the sum signal can be used to help establish the distance between the ball and subsystem 312).

In addition, the position of each ball object is set equal to the position of the brightest pixel in that ball object. Finally, the target detector module 366 transmits the signal and location of each ball object to the output formatter 370. The target detector module 366 may require more than a single camera frame time to complete its functions. This is accommodated by using multiple target detector modules 366, in parallel, as illustrated. Each camera frame is assigned to a target detector module 366 and that module 366 begins to process that frame of data. If another frame of data becomes available prior to completing processing of the first frame, then the new frame is assigned to the next target detector module 366. When a target detection module 366 completes processing its frame, it signals the output formatter 370 that it is ready to transmit its targets.

The output formatter 370 receives the order in which the target detector modules 366 were assigned to camera frames. The output formatter retrieves the ball signal and location from the target detector modules in the order that the frames were collected by waiting for the appropriate target detection module to finish. After retrieving the target information, the output formatter 370 commands that target detection module 366 to reset itself and notifies the subsystem 312 that it is ready to process another camera frame. The output formatter 370 buffers and transmits the target data to the processor 316 using the system bus 318.

The processor 316 is a unit that is typically located remotely from the camera subsystem 312 and at a convenient facility such as the driving range house 330. The processor 316 can include an advanced high speed microprocessor based computer such as an Intel Pentium Pro which operates under the Windows NT™ environment. The processor 316 can also include one or more digital signal processor boards or digital video frame manipulation boards. The processor 316 executes a computer program written in a high level language such as C to accomplish its functions. The processor 316 receives target detect information from the camera subsystem (or subsystems, where more than one subsystem is present for a given range) 312, requests from the reporting stations 320, tracks all moving balls 304 based upon the detect sequence, generates reports for the reporting stations 320 and printers 324, and is accessed directly from the system console 326. Functional components of the processor 316 are described below in connection with FIG. 13.

Figure 13:
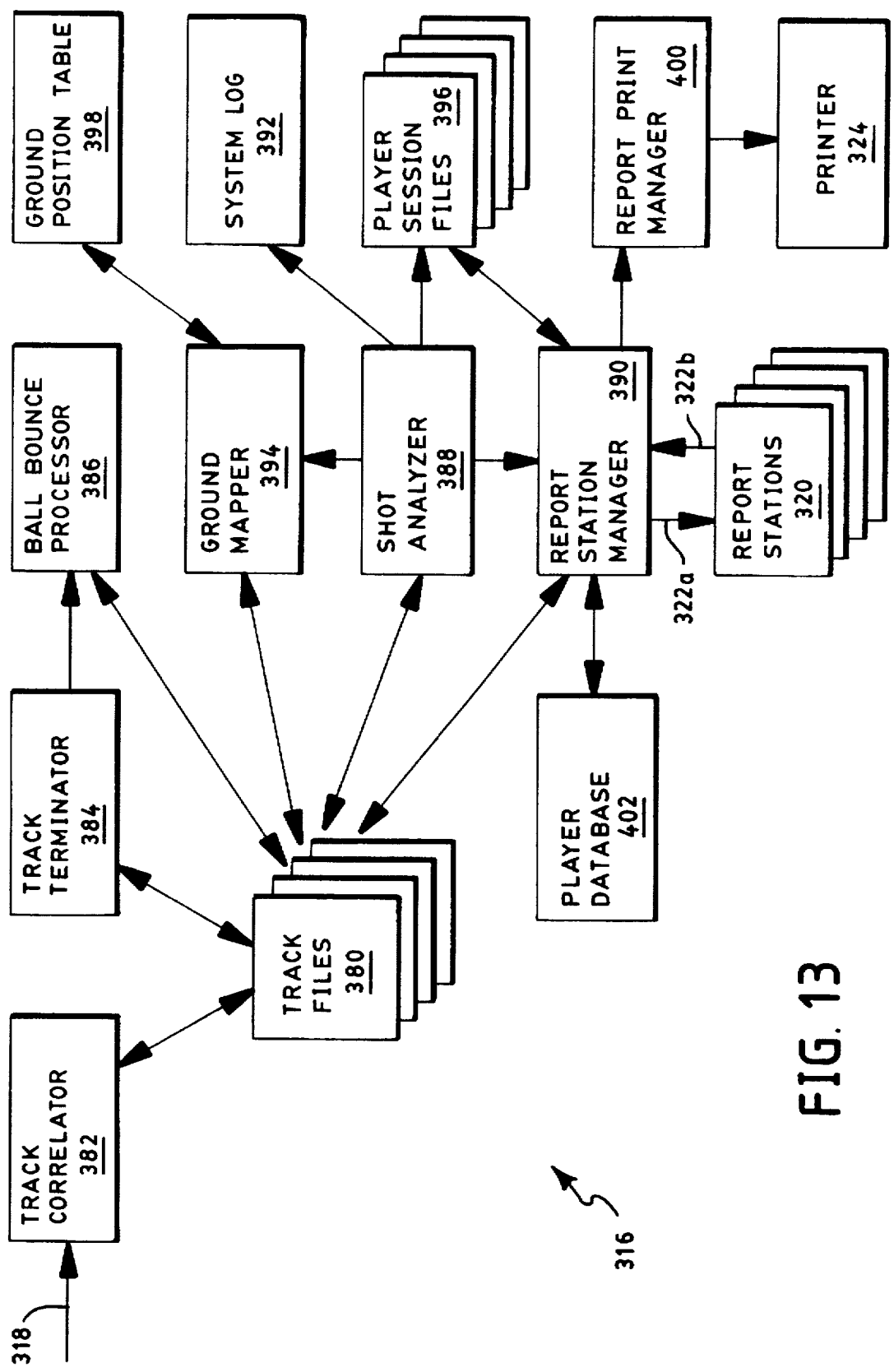
FIG. 13 illustrates one functional block diagram of a processor subsystem used to control at least part of the range system of the invention.

In FIG. 13, separate track files 380 are maintained for each ball flight that is detected. Each track file 380 includes one record for each camera frame where a ball 304 was detected. Each record includes the ball target amplitude, ball location, the camera frame number, and ball bounce flag. If the ball bounce flag is set, then the ball was observed to strike the ground in that frame. When the bounce flag is not set, then the ball did not strike the ground in that frame. Each track file 380 also includes the expected range of amplitudes and the expected range of positions for the ball to take in the next camera frame.

The track correlator 382 receives the target data for each camera frame from the camera subsystem 312 via the system bus 318. Each target is compared to the expected positions and amplitudes for the current track files. If a target is found to fall within the expected position and amplitude of a track file, then a new record is added to the track file for that target and a trajectory is calculated using a spline or least squares fit algorithm, for example. Next, a confidence level for that ball's trajectory is estimated by calculating the RMS error between the ball trajectory and ball positions with the most current positions weighted to a higher degree than older positions. The trajectory is then extended to predict the ball's position and amplitude for the next frame. Based on the confidence level, a range of expected amplitudes and positions, centered about the predicted amplitude and position, are formed and overwrite the old estimates in the track file 380. The extent of the predicted amplitude and position windows are based on the confidence level of the trajectory estimate. As the confidence level increases, the windows are made smaller since smaller windows reduce the likelihood of there being multiple targets that correlate to a given track and also reduce the amount of processing required to decide which detection belongs to which track. Any target that does not correlate with an existing track is considered a new trajectory and a new track file is generated. The new track file's next camera frame expected position and amplitude ranges are set to pre-defined values that may vary with the target's position in the field of view, the ambient lighting conditions, the current image noise level and the target's amplitude.

The track terminator 384 examines each track file 380 to identify and terminate tracks where there is no longer any ball motion. A track is terminated when a preset number of consecutive camera frames do not provide any targets that correlate with that track. If the speed of the ball at the end of the track is below a threshold, then the system concludes that the ball came to rest at the last detection point and the track file is marked as completed. If a track terminates with the ball speed above the threshold, then the last detection location will be compared to positions of any water hazards 306b, sand traps 306a, or other impediments 306 within the range 300, FIG. 10. If the last location is within a preset distance to any of these hazards and the extrapolated trajectory carries the target through that hazard, then the ball 304 will be flagged as a hazard termination. An estimate of where the ball encountered the hazard is made, a new record is appended to the track file for the estimated hazard encounter position and the track file is marked as completed. If the trajectory does not encounter a hazard, then that track is passed to the ball bounce processor 386. If a high speed ball termination can not be correlated by the ball bounce processor 386 within a preset number of camera frames, then the track is marked as completed.

The bounce processor 386 receives track files 380 that were terminated while the ball 304 was still traveling at high speed. The bounce processor 386 analyzes all existing track files and flags any file as a potential bounce if that file has two or more target records and has an origination point away from the tee area 302. The terminated high speed tracks are compared to potential bounce tracks that were generated after the last update to the terminated high speed track. To determine if the terminated high speed track correlates with a potential bounce track, the terminated high speed track is extrapolated forward and the potential bounce track is extrapolated backwards. The two extrapolated tracks are then analyzed to determine if they intersect and, if they do, (a) a new track record is appended to the terminated high speed track file 380, (b) that track record is marked as a bounce event, (c) the ball position for that track record is recorded as the intersection point of the extrapolated tracks, (d) the track records from the potential bounce track are appended to the terminated high speed track file, (e) the potential bounce track file is deleted, and (f) the terminated track file is marked as active. If multiple potential bounce track files correlate with the same terminated high speed track, then the system 316 will consider this a ball strike event, which is defined as a situation where a landing ball strikes one or more stationary balls, resulting in the motion of two or more balls. In this situation, the original ball's final position will be greatly influenced by the collision and tracking the original in-flight ball to it's final position is not useful information since the final position is not representative of the unimpeded ball's distance. Furthermore, it will be difficult for the system 316 to decide which bounce track is from the original ball. When a ball strike is detected, the high speed termination file is marked as a ball strike and an estimate will be made of where the ball would have come to rest if the collision had not occurred.

The shot analyzer 388 generates reports for each terminated track file 380 and passes these reports to the report station manager 390. The shot analyzer reviews each track file after it has been terminated and updates the system log 392 recording the origination position, last position, and termination method. Terminated potential bounce tracks are deleted with no further processing. All other tracks are passed to the ground mapper 394 for determination of the three dimensional coordinates for the starting tee location 302, first bounce position and final rest position. Next, the total travel distance to the first bounce, the final position and distance left or right from the player's selected target are determined from the three dimensional coordinates using trigonometric relations. These data are added to the player's session file 396. Finally, the shot analyzer 388 deletes the track file 380.

The ground mapper 394 receives track files 380 from the shot analyzer 388 and appends the ball positions for the launch point, first bounce, and resting location in a three dimensional coordinate system to the track file 380. The ground mapper 394 compares the position of the ball in the first record to the tee positions 302 mapped to camera 312 azimuth and elevation stored in the ground position table 398. If the ball position corresponds to a tee location 302 then the position of the tee 302 in three space is recorded in the track file 380 as the launch point. If the ball position does not correspond to a tee location 302, then the ground mapper 394 extrapolates the track backwards to estimate the track of the ball 304 prior to the first record. The extrapolated trajectory is compared to the tee locations 302 mapped to camera 312 azimuth and elevation and if it is found to pass through a tee location 302, the position of that tee in three space is recorded in the track file 380 as the launch point. If the ball's trajectory does not pass through a tee box 302, then a flag is set in the track file 380 indicating that the starting tee location could not be found. If a starting tee location was found, then the ground mapper 394 next locates the first bounce record (if there is a bounce record for that track file) and determines the three dimensional ground position of the bounce. The three dimensional ground location is determined by using the pixel number of the target in the bounce record as an index into the ground position table 398 and by retrieving the three dimensional ground position for that pixel from the table 398. Finally, the ground mapper 394 locates the last record in the track file 380 and determines the three dimensional ground position again using the ground position table 398.

The report station manager 390 receives requests from the bus 322, shot reports from the shot analyzer 388, transmits reports along the bus 322, and passes reports to the report printer manager 400. The report station manager 390 responds to the following requests received from the report station request bus 322: clear request; club selection request; target selection request; new player identification request; player identification request save session request; session summary display request; session summary; print request; club summary request; club summary print request; comparison to historical data print request The report station manager 390 also prepares the following reports and directs them to the printer manager 400 or to the report station report bus 322a, 322b: identification card printer report; shot distance report; club summary report; session summary report; historical data report; message report The bus 322 is preferably an IEEE serial communication bus operating in compatible transfer modes. Each record transmitted on the bus 322 can include the requesting station identification, the request type, and request specific data. From the reporting stations 320, each record transmitted on the bus 322 can include the identification for the target station, the report type, and data specific to that report type.

Upon receipt of a shot report from the shot analyzer 388, the report station manager 400 transmits the shot report on the bus 322. The shot report typically includes the distance to the first bounce, the total shot distance, distance left or right of the selected target, current club selection, and the tee where the shot originated from. If the shot encountered a hazard, a message report is sent to that tee indicating the hazard that was encountered.

The message report is a general purpose report used to transmit text information to particular tees 302. The message report includes marking to identify it as a message report, the tee to which the report is being directed, and the text information.

Upon receipt of a clear request, the report station manager 390 will clear player session file for that tee. Upon receipt of a club selection request, the report station manager 390 makes that club the current club in the tee's player session file. Upon receipt of a target selection request, the report station manager 390 will make that target the current target in the tee's player session file. Upon receipt of a new player identification request, the report station manager 390 sends a message report to that station and updates the tee's player session file that a new player identification is pending. The message report requests that the player enter an identification at the report station 320.

Upon receipt of a player identification request, the report station manager 390 check's to see if a new player identification is pending. If a new player identification is not pending, the report manager 390 searches the player data base to verify that the identification is valid. If the identification is valid, the identification is recorded in that tee's player session file. If the identification is invalid, the report station manager 390 sends a message report stating that the identification entered by the player could not be found in the data base 402. If a new player identification is pending, the player data base is searched to verify that there are no existing entries using that identification. If there are no existing entries using that identification, (a) a new entry is added to the data base for that identification, (b) the identification is recorded in that tee's player session file, (c) the new identification pending flag is cleared for that tee, (d) the print manager 400 is directed to print an identification card for that player, and (e) a message report is sent to the report station 320 confirming the identification selection and notifying the player to retrieve his identification card from the identification card printer 324. If there is an existing entry using that identification, a message report is sent to that report station 320 indicating that identification exists and that a different one needs to be selected.

Upon receipt of a save session request from a tee 302, the report station manager 390 saves all data in the tee's player session file to the player's permanent record in the player data base 402. If the player had not entered his identification prior to requesting the session to be saved, then the report station manager 390 sends a message report to that station 320 stating that the player must enter identification prior to saving his session.

Upon receipt of a session summary request, the report station manager 390 will generate a session summary report from the player session file, and transmit the report to the requesting report station 320 via the report station report bus 322. The session summary can include the total number of shots, average first bounce distance, statistical variation of the average first bounce distance, average total distance, statistical variation of the total distance, average position left or right of the selected target 308, statistical variation of the position left or right of the selected target 308, and the total number of hazards 306 encountered.

Those skilled in the art should appreciate that other information can also be transmitted to reporting stations. By way of example, the club house can elect to advertise selected sale items, or an advertiser such as Coca Cola® can "rent" display space so as to encourage consumption. Such additional display entries are made at the clubhouse 330 by way of the interface and console 326, 328.

Upon receipt of a session summary print request, the report station manager 390 will retrieve the session summary report, and pass the report the printer manager 400. The session summary passed to the printer manager 400 may include player identification, the total number of shots, average first bounce distance, statistical variation of the average first bounce distance, average total distance, statistical variation of the total distance, average position left or right of the selected target, statistical variation of the position left or right of the selected target, and the total number of hazards encountered.

Upon receipt of a club summary request, the report station manager 390 retrieves the requested club summary report, marks it as a club report, including the club number, transmits it on the report station bus 122, and marks that report for the tee 302 where the shot originated from. The club summary transmitted on the bus 322 may include the total number of shots for that club, the average first bounce distance for that club, the average total distance for that club, the average position left or right of the target for that club, the total number of hazards encountered for that club, and other selected factors.

Upon receipt of a club summary print request, the report station manager 390 will retrieve the requested club summary report, mark it as a club report, include the club number in the report, pass the report to the print manager, and mark that report for the tee where the shot originated from. The club summary report passed to the print manager 400 may include the total number of shots for that club, the average first bounce distance for that club, the average total distance for that club, the average position left or right of the target for that club, the total number of hazards encountered for that club, and other factors.

Upon receipt of a comparison to historical data print request, the report station manager 390 will retrieve the historical data from the system data base 402, generate a session summary report from the player session file, generate a comparison to historical data report, mark that report for the tee 302 where the shot originated from, and pass the report to the print manager 400. The comparison to historical data report may include the total number of sessions saved in the data base and graphical and/or text representations of average distance for each club vs. date, statistical variation of distance for each club vs. date, average left or right for each club or target vs. date statistical variation of left or right for each club or target vs. date, average distance to first bounce for each club vs. date, statistical variation of first bounce distance for each club vs. date, and other statistical characteristics of the player's records over time, including over a period exceeding one day.

The report print manager 400 receives print reports from the report station manager 390. For each report type, the report print manager 400 generates a formatted file for printing and enters the file in the print queue. The formatted report may include both text information and graphical information. The print queue and printer 324 are managed using software readily available throughout the industry and known to those skilled in the art.

The reporting stations 320 are located at individual tee positions 302, and they allow the golfer to enter requests on the report station request bus 322a, receive reports from the report station report bus 322b, and display the reports to the golfer. Each report station 320 monitors each report on the bus 322 and acts on all reports marked for that station 320. The report station 320 includes buttons and keypads to allow the golfer to make requests and respond to prompts and also provides a display area for displaying text messages, shot information, and graphical depictions of the golf ball's flight.

The system console 326 provides a means to command the system operating modes, review the performance of the system, direct the system to print usage and golfer reports, display system status, enable and disable the external interface, begin and terminate the processor activities, and gain access to the underlying Windows NT operating system.

A three dimensional definition of the ball trajectory is beneficial in many ways. In situations where the starting tee must be determined by extrapolating the trajectory backwards, a three dimensional trajectory significantly increases the likelihood of correctly determining which tee position the ball started from. Three dimensional ball trajectory information will also improve the likelihood that a ball will be associated with the correct track file 380. In a two dimensional system, such as illustrated in FIG. 1, balls that appear close together in an image may not be assigned to the proper track file 380 since they may appear to associate with each others track files 380. With a third dimension available, however, it is unlikely that balls will often appear close together since, in reality, balls on the range 300 are not actually near each other, often, in a 3-D sense. Three dimensional track information also allows the system to predict when a ball bounce event is eminent. Recognizing immediately when a ball bounce has occurred allows the system to more quickly combine the post bounce and pre-bounce tracks which then reduces system processing loads. A complete three dimensional description can also be useful for instructional purposes. The three dimensional data provides a means for determining maximum ball height, trajectory curving (hooking and slicing), ball lift, and other important aspects of a golf shot.

A single camera system such as in FIG. 1 is generally limited to providing two dimensional information since the physical three dimensional world is mapped into the two dimensional plane of the cameras image sensor (i.e. CCD array) by the camera optics. As noted above, 3-D information is nevertheless available by way of ball-to-pixel geometry and by integrating ball energy within one or more pixels and frames. Without these features, however, the 2-D camera image can be used to determine the direction of the ball relative to the camera boresight, but provides no direct information about how far the ball is from the camera.

Limited three dimensional information is nevertheless available from a two dimensional camera image if the three dimensional positions of the ground region, as imaged by each pixel, is known. The ground positions are measured via some auxiliary device, such as differential GPS, surveying, or a directional laser range finder, and then entered into the processor. This approach will allow the three dimensional position of the ball to be determined for any frames where it can be established that the ball is located on the ground, such as the initial tee off frame, a ball bounce frame, or the ball flight termination frame. The three dimensional ground coordinates can then be used to determine the distance that the ball traveled during its flight. The techniques of determining the coordinates can also be used in first mapping the distance between the camera and the ground in the first instance (that is, once a camera is installed, a beacon such as a GPS receiver/transmitter can be walked around the range for correlation with the several pixels).

Two embodiments are hereinafter described for providing three dimensional images of the ball motion so as to improve the reliability and usefulness of the invention: 1) a multiple camera system, and 2) a single camera with dedicated light source.

FIG. 14 depicts the multiple camera system 430 which provides an image of a ball 432 within the range 434 through a minimum of two cameras 436 for any ball location within the tracking volume. Each camera's position and orientation of its optical line of sight is measured in a coordinate system 438 common to all cameras 436. The two dimensional image of the ball 432 generated by each camera 436 and the optical characteristics of each camera 436 define the direction of the ball 432 relative to that camera 436. The three dimensional position of the ball 432 in the common coordinate system 438 is then determined using trigonometric relations applied to the ball directions relative to each camera 436, camera positions, and camera orientations. This processing is accomplished within the three dimensional processor 439. All other elements of FIG. 14 are similar to those elements commonly numbered and described above.

FIG. 15 depicts range system 439 with a single camera 440 with dedicated light source 440a. The dedicated light source 440a illuminates the range 442 and is mounted adjacent to the camera 440 which views the range 442. This embodiment relies on the fact that the intensity of the light 443 originating at the light source 440a and reflected from a ball 444 as seen by the camera 440 will vary according to the distance separating the ball 444 and the camera 440. The camera image defines the ball's direction in azimuth and elevation relative to the camera as it does with the single camera and multi-camera systems. The measured brightness of the ball 444 varies in proportion to the 4th power of its distance to the light source 440a according to the laws of physics and thus provides distance information. Knowing the balls azimuth, elevation, and distance relative to the camera completely defines its position in three space and thus satisfies the needs of a three dimensional imaging system. The light source 440a is sufficiently bright so that its reflected light from a ball 444 as observed by the camera 440 is about ten times brighter than light reflected by the ball 444 from other sources. The light source 440a provides this illumination over the full tracking volume of the range 442. To determine the distance of a ball 444 from the camera 440, the system 439 need only determine the brightness of the ball 444 and compare that to a standard value for a ball 444 at a known distance; the position of the target ball is then determined using the 4th power relationship.

Variation of reflectance between balls is compensated by estimating the reflectance of each ball as it appeared on the tee 302", prior to being hit. Since the position of the tee 302" is known and the illumination of the ball 444 at the tee 302" is known (i.e., can be measured), then the ball's reflectance is determined via physics from its measured brightness.

The 4th power variation of the ball brightness may result in very high dynamic range requirements for the camera 440. One approach to reduce this effect is to take advantage of the 4th power variation of image intensity with the cosine of the angle between the image point and the optical axis. By positioning the camera so the nearest potential ball locations appear well off axis and the farthest potential ball locations are on axis, then the dynamic range required for the camera system can be significantly reduced. Reducing the dynamic range provides direct cost savings in the design, testing and fabrication of the camera 440.

The light source 440a can be selected so that it provides illumination over a very narrow spectral range; an example of such a light source is a laser. The camera 440 in this situation incorporates a narrow spectral bandpass filters centered on the light frequency. The narrow pass band would minimize the amount of energy seen by the system originating from ambient light sources, such as the sun or driving range illumination, while allowing almost all of the reflected light from the light source to enter the system 440. This narrow band light source offers a number of advantages. First, the light source brightness can be reduced since non-light source energy seen by the camera is attenuated by the narrow pass band of the filter.

Reducing the light source brightness provides numerous benefits including reduced power consumption, less distraction to the golfers, and reduces eye safety hazards. The second advantage for this approach is that the camera can, in certain instances, directly view the sun without suffering from solar blinding. Solar blinding refers to a situation where the solar flux is high enough that the system either saturates, and provides no scene information, or must be operated at such a low sensitivity, to prevent saturation from occurring, that the ball target amplitudes are less than the system noise level; in that case the balls are not be detected since they would be indistinguishable from system noise. Using a narrow pass band filter in the camera reduces the amount of solar flux reaching the focal plane and thus can allow the system to directly view the sun without being blinded. Viewing the sun is beneficial since more mounting locations and orientations are available for the camera. Further, the filter color can be matched to the ball color to reduce improve the signal of the ball as compared to its surroundings.

Another consideration in selecting the light source 440a is the spectral response of the human eye and common insects, birds, or mammals. It is preferable for the light source to be at a wavelength beyond that of human vision since a visible light would be distracting to the players and some people could find the light unpleasant. It would be also beneficial to select a light frequency that could not be sensed by flying insects, birds, or mammals. If the light source 440a can be sensed by flying animals, then they may be attracted to the light source. Because the light source is mounted adjacent to the camera, many of the attracted animals would be imaged by the camera and would generate excessive numbers of false targets. Excessive numbers of false targets could overburden the system and prevent it from keeping up with the camera frame rates. Eventually, this could overwhelm the system causing a complete breakdown in system performance. Thus, a light source 440a that can not be sensed by flying animals is preferable to prevent the system from becoming overwhelmed by animal generated false targets.

The most likely spectral frequencies for the light source 440a are in the near to mid infrared. These frequencies are preferable because there are many lasers and sensing elements available over this range, and these frequencies can not be sensed by the human eye. The ultra-violet and shorter wavelengths are less preferable wavebands because of human safety concerns and the public's negative perception of ultra-violet light.

Variations and enhancements can be made in the systems and methods described above, including:

(1) Stereoscopic Systems

The above description has already discussed certain advantages of providing two imaging systems, i.e., a stereoscopic imaging system, within the driving range, such as in FIG. 14. It is worth nothing that there is no particular need, however, to place one camera behind one of the tee-off positions. In the stereoscopic imaging embodiments of the invention, two cameras are arranged to observe the ball in flight in order to establish three dimensional track in x.y and z coordinates. The prior art is clearly unable to provide this feature. In order to provide x.y.z track information, there should be intracamera communication so as to synchronize the respective data gathering locations.

The measurement of azimuth and elevation from multiple cameras can also be used by the tracking algorithm of the invention relative to track association (i.e., which ball belongs to which track file). Specifically, by pairing detections in cameras, detection validity is established as to the appropriate track file. One strong metric for correlating targets between cameras involves the distance of the closest point of approach between the pointing vectors of the two cameras. Another metric is the distance of the closest point of approach to the valid region in and about the driving range (i.e., too far right, left or up).

There is at least one other advantage associated with a steroescopic system: the uncertainty in the event of multiple balls in flight can nearly be eliminated. If two balls come together in one camera, it is unlikely that these two balls will also overlap in the second camera. This eliminates a difficulty associated with single camera tracking as in FIG. 1.

(2) Detection

Detection is preferably made with dedicated hardware performing repetitive tasks. In accord with certain embodiments, detection utilizes a first order FIR filter and pixels are processed one at a time. The resulting image contains a measure of scene background which is subtracted from the next camera frame. The next camera frame is not added to the low pass filtered scene estimate until after detection processing on that frame is completed. After subtracting the scene average, the resulting image is inspected for balls which exceed a threshold. The threshold is dynamic with lighting conditions, season and/or time of day. This threshold can be adaptive based on the number of false detections received over some span in time. The detection process should look for both positive and negative peaks dependent on the balls relative illumination, e.g., front lighting versus the background (i.e., ball against night sky, ball against grass, orange ball against white snow).

Detection processing is preferably co-located with the camera hardware. Communication back to a central processor (CP) thus includes sending sets of detections defined in camera azimuth and elevation space. This eliminates the need for a DSP at the camera, reducing cost. However, it may require a more powerful processor back at the CP. This approach also makes the camera on the pole a line replacable unit (LRU) in that there is little or no uniqueness in the operation of the camera/detection hardware relative to its location. Rather, all mapping of coordinates unique to the particular driving range are performed at the CP.

(3) Track Processing

There are other track processing options. For example, as camera detections are received at the central processor, the detections can be compared to expected positions with respect to tracks created from previous detections. This is accomplished by placing a imaginary box around the expected ball position based on its estimated trajectory. The size of the box is driven by the confidence level of the trajectory estimate. The smaller the box, the less likely there will be multiple balls within the box and the less processing required in order to decide which direction belongs to which track.

Unlike tracking applications in the prior art, the origination point for establishment of tracks according to the invention can be limited to a finite area defined by the tee off position. This spatial restriction, coupled with a launch detection approach defined herein, eases the processing burden of false track initialization. Specifically, detections which do not correlate with existing tracks and which an away from the tee off positions can be dropped. Unlike the prior art, therefore, tracks cannot originate anywhere in the field of view and all unassociated detections need not be considered as potential new tracks. This limitation decreases the processing burden.

(4) Launch Detection

Detecting a point of origin metric can also help bound the overall ball detection problem. For example, detecting that a ball is no longer at a tee off position is one such metric that would be useful when comparing subsequent frames. This factor can occur naturally if the low pass time constant were sufficiently fast in order to remove the ball's image on the tee prior to launch. Imaging a white ball against a dark background produced by artificial turf or a black mat can result in a negative just after launch. Accordingly, detection of the negative after image in the area of the tee off positions tends to indicate that a ball had just launched.

Point of origin ball detection can also occur through illumination by a source on one side of the tee off position with a flat diffuse surface on the other side. The light source illuminates the ball as it leaves the tee position. A wide angle photosensitive detector responds to the ball passing through this illumination and a detection circuit looks for an impulse representative of the ball passing through the field of view of the detector. A baffle prevents the detector from seeing the golfer or his swinging club.

In another point detect scheme, a light sensitive device can be placed at the end of a fibre optic placed within the tee. A ball on top of the tee blocks the light so that, after the ball is hit, light is allowed to enter to trigger a launch detect.

(5) Environmental Concerns

The invention is also suitable for providing other information to a user by way of the LCD displays. For example, by including a wind meter within the range, each golfer can be informed of present wind speed and direction at each station. Such information can be useful to professionals who need to accurately gauge ball motion in such environments.

In addition, the track processing algorithm can include optional adjustment for wind condition on a dynamic basis throughout the ball's flight. That is, with information injected to the track processing algorithms, a ball's motion can become more predictable, improving the accuracy of the system.

A system of the invention preferably includes a ground mapping processor that provides a semi-automated capability for assigning each pixel to a ground location. The ground mapping processor is activated by the system administrator from the system console. The system also includes a ground position beacon that is placed at various locations about the range. The beacon consists of a bright light source with an integral position sensor. The position sensor may be a GPS receiver, an navigation system, a laser range finder, or other positioning system.

By way of example, the laser range finder incorporates an absolute azimuth and elevation measurement of its line of sight relative to some stationary coordinate frame such as that defined by the local horizon and magnetic north. The laser range finder is used in conjunction with a corner cube retro-reflector or similar device. The corner cube retro-reflector is placed at a fixed location on the range, such as the base of a camera pole, and all position measurements of the laser range finder are made relative to the fixed position of the corner cube retro-reflector. The beacon's brightness is adjusted so as it will appear as the brightest object in the camera's field of view at all times. In addition, the beacon's brightness is flashed on and off at a frequency above the target detection processor's high pass filter cut-on frequency.

A position on the field is thus measured by first locating the ground position beacon at that location and activating the ground mapping processor. Next, the beacon's position sensor is activated and the ground position is determined (in 3-D) relative to a fixed position coordinate system. The ground position is recorded for future entry into the system's ground mapping table. The beacon is then switched on for a fixed time interval, flashing a fixed number of times, and is then turned off for a minimum period of time. Simultaneous with these events, the ground mapping processor's beacon locator is processing all targets passed to it from the individual camera/target detector assemblies. Among its functions, the beacon locator constructs a pixel target record for each target that is passed to it. The pixel time record is a 2 column by n row integer array. Each row of the pixel target record corresponds to a time. The first column of the pixel target record contains a value of 1 if a target was detected at that pixel or it contains a zero if a target was not detected at that pixel, the second column contains the time relative to some internal system clock. When the beacon locator receives a target it checks to see if a pixel target record exists for that pixel.

Appendix A contains, for disclosure purposes, a description of coordinate transformations and the like in view of monitoring golf balls according to the invention. Appendix B contains, for disclosure purposes, simulation results used to model the invention, including the coordinates of Appendix A. Appendix C contains, for disclosure purposes, one camera evaluation conducted relative to a solid state camera in use according to the methods of the invention. Appendix D contains, for disclosure purposes, additional embodiments suitable for application with the invention. Appendix E contains, for disclosure purposes, commentary on different aspects of the invention, including: selected applications, discussions of a hit detector suitable for determining when a ball is struck at the tee off position, and another passive 3-D system of the invention. Appendix F contains, for disclosure purposes, commentary and further optional detail for a camera subsystem of the invention such as described in connection with FIG. 12.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

In view of the foregoing, what is claimed as new and secured by the Letters Patent is:

1. A method for tracking golf balls within a driving range, the driving range being of the type having a fairway for driving balls therein and a plurality of tee-off positions adjacent to the fairway, comprising:

imaging a portion of the fairway and at least one tee-off position onto a solid-state detector focal plane array with a plurality of detectors;

sequentially capturing, from the array, frames of data corresponding to an image of the fairway and position on the detectors;

detecting each moving golf ball within the frames by determining frame-to-frame movement of an image of the golf ball through one or more detectors; and tracking the golf ball motion to determine a distance traveled for each golf ball originating from the tee-off position.

2. A method according to claim 1, further comprising the step of informing a user at the tee-off position of the distance.

3. A method according to claim 1, further comprising the step of determining a distance between the camera and the ball by comparing the image of the golf ball to one or more detector elements.

4. A method according to claim 1, wherein the step of imaging comprises imaging a plurality of tee-off positions, and further comprising the steps of determining origination points of each moving golf ball by curve-fitting golf ball motion along an arc and associating the origination points with one tee-off position, the arc being determined by discrete points representing golf ball detections through a plurality of frames.

5. A method according to claim 1, further comprising the step of determining a distance traveled beyond a fairway net by estimating golf ball motion along an arc, the arc being determined by discrete points representing golf ball detections through a plurality of frames.

6. A method according to claim 1, further comprising utilizing user station mounted with the tee-off position to inform a user of information such as distance and slice angle of balls hit from the position.

7. A method according to claim 1, further comprising storing information relative to a plurality of golf ball tracks from the tee-off position so as to compile statistical information for a user thereof.

8. A method according to claim 1, further comprising mounting a camera housing the solid state focal plane onto a pole so as to image the fairway and the position from a selected altitude.

9. A method according to claim 1, further comprising the step of determining a three-dimensional location of the ball and tracking golf ball motion to determine an angle of golf ball motion relative to the tee-off position.

10. A method according to claim 9, further comprising informing a user at the position of the angle.

11. A method according to claim 1, further comprising the steps of detecting the golf ball within each frame, transmitting detect information to a computer connected to the focal plane, and utilizing the computer to track golf ball motion based upon the detect information.

12. A method according to claim 11, further comprising transmitting distance information from the computer to a user at the position.

13. A method according to claim 1, further comprising the steps of measuring reflected energy of the ball at the tee-off position, storing the energy, and determining a distance between the golf ball and a camera housing the focal plane by determining the change of energy reflected by the ball during motion through the frames.

14. A method according to claim 13, further comprising the step of determining whether the distance between the camera and the golf ball is approximately equal to a distance between the camera and fairway ground, thereby determining whether the ball is airborne or on the ground.

15. A method according to claim 1, further comprising the step of utilizing a plurality of solid state cameras to image the fairway so as to determine a three-dimensional position of the golf ball.

16. A method according to claim 15, further comprising the step of utilizing the three-dimensional position to determine whether the ball is airborne or on the ground.

17. A method according to claim 15, further comprising the step of utilizing the three-dimensional position to discriminate tracking between a plurality of golf ball motions through the frames.

18. A method according to claim 15, further comprising the step of synchronizing the cameras in time so that golf ball images can be correlated between the cameras.

19. A system for tracking golf balls from a plurality of tee-off positions at a driving range, comprising:

at least one camera having a solid state focal plane for imaging the range and the positions;

signal processing means for capturing frames of data from the camera and for detecting golf balls moving through successive frames;

a computer connected to the camera for processing detect information and for determining, for each of the golf balls, a golf ball track, a golf ball track and an associated tee-off position for the track; and a plurality of user stations, each station being situated at a unique tee-off position and connected to the computer, the computer transmitting information about the golf ball track to the associated tee-off position.

20. A system according to claim 19, wherein the computer further comprises means for storing statistical information about a plurality of tracks associated with a particular tee-off station.

21. A system according to claim 19, wherein the camera comprises optics having a field of view of approximately 90 degrees.

22. A system according to claim 19, wherein the focal plane comprises at least approximately one million pixels.

23. A system according to claim 19, wherein the signal processing means comprises means for determining the distance between the camera and each of the moving golf balls by estimating energy reflected by the golf balls during flight as compared to energy reflected by the golf balls at respective tee-off positions.

24. A system according to claim 19, further comprising (a) a plurality of cameras arranged to view overlapping regions of the range, and (b) means for synchronizing the cameras in time, and wherein the computer comprises means for correlating detect information to determine each golf ball position three-dimensionally.

* * * * *